United States Patent
Okamura et al.

(10) Patent No.: US 8,462,297 B2
(45) Date of Patent: Jun. 11, 2013

(54) POLARIZING DIFFUSER FILM, METHOD FOR PRODUCING POLARIZING DIFFUSER FILM, AND LIQUID CRYSTAL DISPLAY DEVICE COMPRISING POLARIZING DIFFUSER FILM

(75) Inventors: Tomoyuki Okamura, Ichihara (JP); Tamio Kawasumi, Chiba (JP); Yuji Inatomi, Chiba (JP); Michio Eriguchi, Chiba (JP); Masaki Misumi, Yokohama (JP); Masataka Iwata, Ichihara (JP); Haruo Inoue, Zushi (JP); Hiroshi Mori, Ichihara (JP); Hirofumi Zenkoh, Chiba (JP)

(73) Assignee: Mitsui Chemicals, Inc., Tokyo (JP)

( * ) Notice: Subject to any disclaimer, the term of this patent is extended or adjusted under 35 U.S.C. 154(b) by 206 days.

(21) Appl. No.: 12/894,072

(22) Filed: Sep. 29, 2010

(65) Prior Publication Data

US 2011/0051053 A1 Mar. 3, 2011

Related U.S. Application Data

(63) Continuation-in-part of application No. PCT/JP2009/003096, filed on Jul. 3, 2009.

(30) Foreign Application Priority Data

| Jul. 4, 2008 | (JP) | 2008-175942 |
| Nov. 11, 2008 | (JP) | 2008-288868 |
| Dec. 11, 2008 | (JP) | 2008-315926 |
| Dec. 26, 2008 | (JP) | 2008-333997 |
| May 15, 2009 | (JP) | 2009-119085 |

(51) Int. Cl.
*G02F 1/1335* (2006.01)

(52) U.S. Cl.
USPC .......... 349/96; 349/112

(58) Field of Classification Search
None
See application file for complete search history.

(56) References Cited

U.S. PATENT DOCUMENTS

| 3,561,841 | A | 2/1971 | Norvaisa et al. |
| 4,824,882 | A | 4/1989 | Nakamura et al. |
| 6,018,419 | A * | 1/2000 | Cobb et al. ............ 359/485.04 |
| 2001/0008464 | A1 * | 7/2001 | Ouderkirk et al. ............ 359/497 |
| 2005/0019530 | A1 | 1/2005 | Merrill et al. |
| 2006/0007371 | A1 * | 1/2006 | Miyatake et al. ............ 349/96 |

(Continued)

FOREIGN PATENT DOCUMENTS

| JP | 9-506985 | 7/1997 |
| JP | 11-281975 | 10/1999 |

(Continued)

OTHER PUBLICATIONS

International Search Report mailed Aug. 4, 2009 in corresponding International application No. PCT/JP2009/003096.

(Continued)

*Primary Examiner* — Rhonda Peace
(74) *Attorney, Agent, or Firm* — Foley & Lardner LLP

(57) ABSTRACT

Disclosed is a film having polarization selectivity and diffusibility, and a means for easily producing the film. The polarizing diffuser film is composed of substantially one kind of crystalline resin having an intrinsic birefringence of not less than 0.1, has a total light transmittance to visible light of 50-90%, a transmission haze to visible light of 15-90% and a transition polarization degree to visible light of 20-90%.

20 Claims, 24 Drawing Sheets

U.S. PATENT DOCUMENTS

| | | | |
|---|---|---|---|
| 2008/0088961 A1 | 4/2008 | Kushida | |
| 2008/0310171 A1* | 12/2008 | Hiraishi et al. | 362/339 |
| 2009/0262348 A1* | 10/2009 | Mazurek et al. | 356/364 |
| 2010/0073607 A1* | 3/2010 | Choi et al. | 349/96 |
| 2011/0051053 A1* | 3/2011 | Okamura et al. | 349/96 |

FOREIGN PATENT DOCUMENTS

| | | |
|---|---|---|
| JP | 2000-506989 | 6/2000 |
| JP | 2001-49008 | 2/2001 |
| JP | 2001-264539 | 9/2001 |
| JP | 2003-75643 | 3/2003 |
| JP | 2004-38204 | 2/2004 |
| JP | 2004-252082 | 9/2004 |
| JP | 2005-531445 | 10/2005 |
| JP | 2006-063195 | 3/2006 |
| JP | 2007-206569 | 8/2007 |
| JP | 2007-219073 | 8/2007 |
| JP | 2007-272052 | 10/2007 |
| JP | 2008-52170 | 3/2008 |
| JP | 2008-537795 | 9/2008 |
| WO | WO 86/02170 | 4/1986 |
| WO | WO 95/17692 A1 | 6/1995 |
| WO | WO 2004/002717 A1 | 1/2004 |
| WO | WO-2006/009293 | 1/2006 |
| WO | WO 2006/110402 A1 | 10/2006 |

OTHER PUBLICATIONS

Communication (Supplementary European Search Report) in EP Appln No. 09773196.2, dated Jun. 8, 2011.

* cited by examiner

TABLE 3

| EXAMPLES/ COMPARATIVE EXAMPLES | SHEET (S) | | THICKNESS | POLARIZING DIFFUSION FILM | | | |
|---|---|---|---|---|---|---|---|
| | TRANSMISSION HAZE | CRYSTALLINITY | | TOTAL LIGHT TRANSMITTANCE | TRANSMISSION POLARIZATION DEGREE | TRANSMISSION HAZE | CRYSTALLINITY |
| EXAMPLE 12 | 25.4% | 4% | 72μm | 77.3% | 33.9% | 39.9% | 10% |
| EXAMPLE 13 | 44.0% | 5% | 72μm | 73.9% | 37.5% | 60.4% | 13% |
| EXAMPLE 14 | 29.4% | 11% | 63μm | 74.1% | 36.6% | 25.2% | 28% |
| EXAMPLE 15 | 25.4% | 4% | 134μm | 66.3% | 47.2% | 47.6% | 12% |
| COMPARATIVE EXAMPLE 6 | 1.4% | 2% | 70μm | 89.4% | 8.2% | 9.9% | 4% |

FIG.14

TABLE 4

| EXAMPLES | RESIN | STRETCHING SCHEME | HEATING TEMPERATURE/ HEATING TIME BEFORE PRE-HEATING | HAZE (%) BEFORE PRE-HEATING | PRE-HEATING TEMPERATURE/ PRE-HEATING TIME BEFORE STRETCHING | STRETCH RATIO | STRETCHING RATE (mm/sec) | STRETCHING TEMP. (°C) |
|---|---|---|---|---|---|---|---|---|
| EXAMPLE 16 | RESIN A | SIDE-CLAMPED | - | - | 118°C/8 min | 5.0 | 48 | 118 |
| EXAMPLE 17 | RESIN A | SIDE-CLAMPED | 120°C/2.8 min | 22 | 116°C/2 min | 5.0 | 48 | 116 |
| EXAMPLE 18 | RESIN A | SIDE-CLAMPED | 120°C/4.4 min | 7.7 | 116°C/2 min | 5.0 | 24 | 116 |
| EXAMPLE 19 | RESIN A | SIDE-CLAMPED | 120°C/4.4 min | 7.6 | 118°C/2 min | 5.0 | 48 | 118 |
| EXAMPLE 20 | RESIN A | SIDE-CLAMPED | 120°C/4.8 min | 19.4 | 116°C/2 min | 5.0 | 24 | 116 |
| EXAMPLE 21 | RESIN A | SIDE-CLAMPED | 120°C/4.8 min | 19.6 | 117°C/2 min | 5.0 | 48 | 117 |
| EXAMPLE 22 | RESIN A | SIDE-CLAMPED | 120°C/4.5 min | 10.9 | 131°C/2 min | 4.5 | 48 | 131 |
| EXAMPLE 23 | RESIN A | SIDE-CLAMPED | 120°C/4.5 min | 9.1 | 131°C/2 min | 4.5 | 150 | 131 |
| EXAMPLE 24 | RESIN A | SIDE-CLAMPED | 120°C/4.5 min | 17.0 | 130°C/1 min | 4.5 | 48 | 130 |
| EXAMPLE 25 | RESIN A | SIDE-CLAMPED | 120°C/4.8 min | 19.7 | 133°C/1 min | 4.5 | 150 | 133 |
| EXAMPLE 26 | RESIN A | SIDE-CLAMPED | 120°C/5.2 min | 20.0 | 101°C/1 min | 4.5 | 48 | 101 |
| EXAMPLE 27 | RESIN A | SIDE-UNCLAMPED | 120°C/4.7 min | 8.9 | 117°C/2 min | 5.5 | 24 | 117 |
| EXAMPLE 28 | RESIN A | SIDE-UNCLAMPED | 120°C/4.0 min | 10.9 | 116°C/2 min | 5.5 | 48 | 116 |
| EXAMPLE 29 | RESIN A | SIDE-CLAMPED | 120°C/4.4 min | 7.5 | 117°C/2 min | 5.0 | 200 | 117 |
| EXAMPLE 30 | RESIN A | SIDE-CLAMPED | 120°C/4.8 min | 19.7 | 116°C/2 min | 5.0 | 200 | 116 |
| EXAMPLE 31 | RESIN A | SIDE-UNCLAMPED | 120°C/4.5 min | 10.8 | 116°C/2 min | 5.5 | 173 | 116 |
| COMPARATIVE EXAMPLE 7 | RESIN A | SIDE-CLAMPED | - | - | 124°C/2 min | 4.5 | 48 | 124 |
| COMPARATIVE EXAMPLE 8 | RESIN A | SIDE-CLAMPED | - | - | 118°C/6 min | 6.0 | 48 | 118 |
| COMPARATIVE EXAMPLE 9 | RESIN A | SIDE-CLAMPED | - | - | 99°C/2 min | 3.6 | 48 | 99 |
| COMPARATIVE EXAMPLE 10 | RESIN A | SIDE-CLAMPED | - | - | 103°C/2 min | 3.0 | 48 | 103 |
| COMPARATIVE EXAMPLE 11 | RESIN A | SIDE-CLAMPED | - | - | 99°C/2 min | 4.0 | 48 | 99 |
| COMPARATIVE EXAMPLE 12 | RESIN A | SIDE-CLAMPED | 120°C/4.4 min | 10.4 | 101°C/1 min | 4.5 | 48 | 101 |
| COMPARATIVE EXAMPLE 13 | RESIN A | SIDE-CLAMPED | 120°C/4.5 min | 20.7 | 101°C/1 min | 4.5 | 150 | 101 |

FIG.15

TABLE 5

| EXAMPLES | RESIN | STRETCHING SCHEME | HEATING TEMPERATURE/ HEATING TIME BEFORE PRE-HEATING | HAZE (%) BEFORE PRE-HEATING | PRE-HEATING TEMPERATURE/ PRE-HEATING TIME BEFORE STRETCHING | STRETCH RATIO | STRETCHING RATE (mm/sec) | STRETCHING TEMP. (°C) | TRANSMISSION POLARIZATION DEGREE@100 μm | MOR-c |
|---|---|---|---|---|---|---|---|---|---|---|
| EXAMPLE 32 | RESIN B | SIDE-CLAMPED | 120°C/2.4 min | 8.2 | 117°C/2 min | 5.0 | 24 | 117 | 31.8% | 1.79 |
| EXAMPLE 33 | RESIN B | SIDE-CLAMPED | 120°C/2.4 min | 8.2 | 117°C/2 min | 5.0 | 48 | 117 | 33.6% | 2.43 |
| EXAMPLE 34 | RESIN B | SIDE-CLAMPED | 120°C/5.0 min | 21.4 | 116°C/2 min | 5.0 | 24 | 116 | 37.1% | 2.21 |
| EXAMPLE 35 | RESIN B | SIDE-CLAMPED | 120°C/5.0 min | 21.3 | 119°C/2 min | 5.0 | 48 | 119 | 36.7% | 2.84 |
| EXAMPLE 36 | RESIN B | SIDE-CLAMPED | 120°C/5.0 min | 22.1 | 117°C/2 min | 5.0 | 48 | 117 | 35.7% | 3.01 |
| COMPARATIVE EXAMPLE 14 | RESIN B | SIDE-CLAMPED | 120°C/2.4 min | 8.1 | 117°C/2 min | 5.0 | 200 | 117 | 21.6% | 4.74 |
| COMPARATIVE EXAMPLE 15 | RESIN B | SIDE-CLAMPED | 120°C/5.0 min | 21.7 | 118°C/2 min | 5.0 | 200 | 118 | 24.7% | 4.49 |
| EXAMPLE 37 | RESIN C | SIDE-CLAMPED | 120°C/5.3 min | 8.4 | 116°C/2 min | 5.0 | 48 | 116 | 33.9% | 4.95 |
| EXAMPLE 38 | RESIN C | SIDE-CLAMPED | 120°C/5.0 min | 21.1 | 116°C/2 min | 5.0 | 48 | 116 | 26.7% | 5.15 |
| COMPARATIVE EXAMPLE 16 | RESIN C | SIDE-CLAMPED | — | 0.6 | 116°C/2 min | 5.0 | 48 | 116 | 12.5% | 2.69 |
| COMPARATIVE EXAMPLE 17 | RESIN C | SIDE-CLAMPED | 120°C/7.2 min | 43 | 116°C/2 min | 5.0 | 48 | 116 | 12.6% | 5.25 |
| EXAMPLE 39 | RESIN D | SIDE-CLAMPED | 120°C/2.8 min | 9.3 | 116°C/2 min | 5.0 | 48 | 116 | 46.0% | 4.96 |
| EXAMPLE 40 | RESIN D | SIDE-CLAMPED | 120°C/3.5 min | 19.8 | 116°C/2 min | 5.0 | 48 | 116 | 36.5% | 4.90 |
| COMPARATIVE EXAMPLE 18 | RESIN D | SIDE-CLAMPED | — | 0.6 | 117°C/2 min | 5.0 | 48 | 117 | 24.8% | 1.70 |
| COMPARATIVE EXAMPLE 19 | RESIN D | SIDE-CLAMPED | 120°C/3.7 min | 40.2 | 120°C/2 min | 4.0 | 48 | 120 | 19.5% | 6.11 |

FIG.16

TABLE 6

| EXAMPLES | FILM THICKNESS | TOTAL LIGHT TRANSMITTANCE (%) | TRANSMISSION POLARIZATION DEGREE(%) (NOTE[1]) | TRANSMISSION HAZE (%) (NOTE[2]) | CRYSTALLINITY (NOTE[3]) | MOLECULAR ORIENTATION RATIO-CORRECTION MOR-c |
|---|---|---|---|---|---|---|
| EXAMPLE 16 | 75 μm | 72.5 | 36.0(43.8) | 53.7(64.1) | 21% | 3.18 |
| EXAMPLE 17 | 76 μm | 74.7 | 36.0(41.2) | 57.0(67.0) | 17% | 2.73 |
| EXAMPLE 18 | 72 μm | 77.3 | 33.9(39.9) | 39.9(50.7) | 10% | 1.65 |
| EXAMPLE 19 | 72 μm | 75.8 | 35.8(42.0) | 46.2(57.8) | 14% | 1.96 |
| EXAMPLE 20 | 72 μm | 73.9 | 37.5(44.1) | 60.4(72.4) | 13% | 1.98 |
| EXAMPLE 21 | 73 μm | 74.2 | 37.1(43.3) | 59.3(70.8) | 20% | 2.87 |
| EXAMPLE 22 | 74 μm | 74.3 | 34.0(39.5) | 60.1(71.1) | - | 1.47 |
| EXAMPLE 23 | 70 μm | 73.9 | 35.5(42.3) | 58.6(71.7) | - | 2.21 |
| EXAMPLE 24 | 78 μm | 72.6 | 35.6(40.2) | 68.4(77.2) | - | 1.63 |
| EXAMPLE 25 | 79 μm | 71.1 | 39.7(44.6) | 61.8(70.4) | - | 2.56 |
| EXAMPLE 26 | 89 μm | 83.6 | 20.1(21.3) | 28.1(31.0) | - | 5.02 |
| EXAMPLE 27 | 134 μm | 66.3 | 47.2(40.9) | 47.6(38.2) | 12% | 1.82 |
| EXAMPLE 28 | 138 μm | 62.6 | 50.1(42.9) | 52.5(41.7) | 20% | 2.79 |
| EXAMPLE 29 | 73 μm | 82.0 | 23.7(27.7) | 31.4(40.3) | 32% | 5.26 |
| EXAMPLE 30 | 79 μm | 80.8 | 24.0(26.9) | 43.9(51.9) | 31% | 5.64 |
| EXAMPLE 31 | 156 μm | 69.3 | 34.3(27.5) | 61.6(45.9) | 31% | 6.74 |
| COMPARATIVE EXAMPLE 7 | 70 μm | 89.4 | 8.2(9.8) | 9.9(13.8) | 4% | 1.21 |
| COMPARATIVE EXAMPLE 8 | 53 μm | 87.0 | 16.8(23.1) | 8.0(14.5) | 29% | 4.32 |
| COMPARATIVE EXAMPLE 9 | 99 μm | 88.9 | 10.6(10.7) | 0.8(0.8) | 28% | 1.46 |
| COMPARATIVE EXAMPLE 10 | 141 μm | 89.7 | 7.7(6.5) | 1.8(1.3) | 6% | 3.82 |
| COMPARATIVE EXAMPLE 11 | 82 μm | 88.8 | 12.9(14.2) | 1.1(1.4) | 28% | 5.47 |
| COMPARATIVE EXAMPLE 12 | 90 μm | 84.8 | 18.7(19.7) | 18.3(20.1) | - | 5.30 |
| COMPARATIVE EXAMPLE 13 | 90 μm | 84.9 | 16.8(17.7) | 21.0(23.1) | - | 5.96 |

NOTE[1]: VALUES IN PARENTHESES ARE VALUES OF TRANSMISSION POLARIZATION DEGREE@100 μm
NOTE[2]: VALUES IN PARENTHESES ARE VALUES OF TRANSMISSION HAZE@100 μm
NOTE[3]: HYPHENS IN THE COLUMN INDICATE THAT NO MEASUREMENTS WERE MADE

FIG.17

TABLE 7

| EXAMPLES | FILM THICKNESS | TOTAL LIGHT TRANSMITTANCE(%) | TRANSMISSION POLARIZATION DEGREE(%) (NOTE¹) | TRANSMISSION HAZE (%) (NOTE²) | CRYSTALLINITY | MOLECULAR ORIENTATION RATIO-CORRECTION MOR-c |
|---|---|---|---|---|---|---|
| EXAMPLE 32 | 44μm | 84.6 | 21.1 (31.8) | 37.2 (65.3) | 10% | 1.79 |
| EXAMPLE 33 | 42μm | 83.9 | 21.8 (33.6) | 44.7 (75.6) | 20% | 2.43 |
| EXAMPLE 34 | 44μm | 81.3 | 24.7 (37.1) | 55.7 (84.2) | 16% | 2.21 |
| EXAMPLE 35 | 44μm | 81.3 | 24.7 (36.7) | 58.6 (86.5) | 16% | 2.84 |
| EXAMPLE 36 | 46μm | 79.9 | 24.3 (35.7) | 58.9 (85.5) | 22% | 3.01 |
| COMPARATIVE EXAMPLE 14 | 52μm | 86.7 | 15.6 (21.6) | 25.1 (42.7) | 33% | 4.74 |
| COMPARATIVE EXAMPLE 15 | 51μm | 84.5 | 17.6 (24.7) | 54.0 (78.2) | 33% | 4.49 |
| EXAMPLE 37 | 72μm | 80.0 | 28.8 (33.9) | 17.2 (23.1) | 29% | 4.95 |
| EXAMPLE 38 | 79μm | 81.6 | 23.7 (26.7) | 20.0 (24.6) | 28% | 5.15 |
| COMPARATIVE EXAMPLE 16 | 64μm | 89.4 | 10.0 (12.5) | 0.5 (0.8) | 25% | 2.69 |
| COMPARATIVE EXAMPLE 17 | 103μm | 83.4 | 12.7 (12.6) | 27.4 (26.7) | 30% | 5.25 |
| EXAMPLE 39 | 63μm | 74.1 | 36.6 (46.0) | 25.2 (36.9) | 28% | 4.96 |
| EXAMPLE 40 | 88μm | 73.6 | 34.2 (36.5) | 34.1 (37.8) | 29% | 4.90 |
| COMPARATIVE EXAMPLE 18 | 66μm | 86.4 | 20.1 (24.8) | 3.2 (4.9) | 14% | 1.70 |
| COMPARATIVE EXAMPLE 19 | 86μm | 81.6 | 18.1 (19.5) | 21.6 (24.6) | 30% | 6.11 |

NOTE¹: VALUES IN PARENTHESES ARE VALUES OF TRANSMISSION POLARIZATION DEGREE@100μm
NOTE²: VALUES IN PARENTHESES ARE VALUES OF TRANSMISSION HAZE@100μm

FIG.18

TABLE 8

| EXAMPLES | FILM THICKNESS | TOTAL LIGHT TRANSMITTANCE (%) (NOTE¹) | TRANSMISSION POLARIZATION DEGREE (%) (NOTE²) | TRANSMISSION HAZE (%) (NOTE³) | CRYSTALLINITY | BRIGHT AREA RATIO IN TEM IMAGE |
|---|---|---|---|---|---|---|
| EXAMPLE 16 | 75μm | 72.5 (65.1) | 38.0 (43.8) | 53.7 (64.1) | 21% | 47% |
| EXAMPLE 18 | 72μm | 77.3 (69.9) | 33.9 (39.9) | 39.9 (50.7) | 10% | 12% |
| EXAMPLE 20 | 72μm | 73.9 (65.6) | 37.5 (44.1) | 60.4 (72.4) | 13% | 46% |
| EXAMPLE 27 | 134μm | 66.3 (73.6) | 47.2 (40.9) | 47.6 (38.2) | 12% | 50% |
| EXAMPLE 29 | 73μm | 82.0 (76.2) | 23.7 (27.7) | 31.4 (40.3) | 32% | 67% |
| EXAMPLE 30 | 79μm | 80.8 (76.3) | 24.0 (26.9) | 43.9 (51.9) | 31% | 63% |
| EXAMPLE 32 | 44μm | 84.6 (68.4) | 21.1 (31.8) | 37.2 (65.3) | 10% | 35% |
| EXAMPLE 34 | 44μm | 81.3 (62.6) | 24.7 (37.1) | 55.7 (84.2) | 16% | 35% |
| EXAMPLE 37 | 72μm | 80.0 (73.3) | 28.8 (33.9) | 17.2 (23.1) | 29% | 73% |
| EXAMPLE 39 | 63μm | 74.1 (62.1) | 36.6 (46.0) | 25.2 (36.9) | 28% | 57% |

NOTE¹: VALUES IN PARENTHESES ARE VALUES OF TOTAL LIGHT TRANSMITTANCE@100μm
NOTE²: VALUES IN PARENTHESES ARE VALUES OF TRANSMISSION POLARIZATION DEGREE@100μm
NOTE³: VALUES IN PARENTHESES ARE VALUES OF TRANSMISSION HAZE@100μm

FIG.20

TABLE 9

| COMPARATIVE EXAMPLES | FILM THICKNESS | TOTAL LIGHT TRANSMITTANCE (%) (NOTE[1]) | TRANSMISSION POLARIZATION DEGREE (%) (NOTE[2]) | TRANSMISSION HAZE (%) (NOTE[3]) |
|---|---|---|---|---|
| COMPARATIVE EXAMPLE 7 | 70 μm | 89.4 (85.3) | 8.2 (9.8) | 9.9 (13.8) |
| COMPARATIVE EXAMPLE 8 | 53 μm | 87.0 (76.9) | 16.8 (23.1) | 8.0 (14.5) |
| COMPARATIVE EXAMPLE 9 | 99 μm | 88.9 (88.8) | 10.6 (10.7) | 0.8 (0.8) |
| COMPARATIVE EXAMPLE 10 | 141 μm | 89.7 (92.6) | 7.7 (6.5) | 1.8 (1.3) |
| COMPARATIVE EXAMPLE 11 | 82 μm | 88.8 (86.5) | 12.9 (14.2) | 1.1 (1.4) |

NOTE[1]: VALUES IN PARENTHESES ARE VALUES OF TOTAL LIGHT TRANSMITTANCE@100 μm
NOTE[2]: VALUES IN PARENTHESES ARE VALUES OF TRANSMISSION POLARIZATION DEGREE@100 μm
NOTE[3]: VALUES IN PARENTHESES ARE VALUES OF TRANSMISSION HAZE@100 μm
NOTE[4]: NO SEA-ISLAND STRUCTURES WERE OBSERVED

FIG.21

POLARIZING DIFFUSER FILM, METHOD FOR PRODUCING POLARIZING DIFFUSER FILM, AND LIQUID CRYSTAL DISPLAY DEVICE COMPRISING POLARIZING DIFFUSER FILM

CROSS-REFERENCE TO RELATED APPLICATIONS

This application is a continuation-in-part of International Application No PCT/JP2009/003096, filed 3 Jul. 2009.

TECHNICAL FIELD

The present invention relates to a polarizing diffuser film, a manufacturing method of the same, and a liquid crystal display device including the same. More particularly, the present invention relates to a polarizing diffuser film and the like suitable for liquid crystal display devices.

BACKGROUND ART

Liquid crystal display devices have been widely used as display units for electrical devices including computers, TV sets and cellular phones, but are increasingly required to have further improved display characteristics as well as lower power consumption. A possible approach to meet these requirements is twofold: adequately diffusing light from the light source, and improving the use efficiency of light from the light source. Specifically, when the light emitted from the light source is adequately diffused, the liquid crystal display device is able to offer a wider viewing angle and/or increased in-plane luminance uniformity. High-light use efficiency can realize not only increased luminance of the entire liquid crystal display device for brighter display, but also lower power consumption.

Patent Document 1 discloses a reflective polarizer which allows polarized light beam (a) of specific linear polarization to pass though but reflects polarized light beam (b) with polarization perpendicular to that of light beam (a). Patent Document 1 also discloses a liquid crystal display device which includes this reflective polarizer. The liquid crystal display device includes, in the order from the display-screen surface, a liquid crystal cell, a reflective polarizer, a backlight, and a diffusive reflector.

Among light beams with different polarizations from the backlight, polarized light beam (a) passes through the reflective polarizer as a display light beam, whereas polarized light beam (b) is reflected back by the reflective polarizer as a reflection light beam. Polarized light beam (b) reflected by the reflective polarizer is again reflected by the diffusive reflector while being randomly polarized, whereby the light beam is converted to light containing both polarized light beam (a) and polarized light beam (b). Among light beams of the randomly-polarized light, polarized light beam (a) passes through the reflective polarizer (a) as a display light beam, whereas polarized light beam (b) is again reflected as a reflected light beam. Patent Document 1 discloses that use efficiency of light from the backlight can be enhanced with this configuration. The disclosed reflective polarizer is a multi-layered film consisting of films A made of polyethylene naphthalate and films B made of copolyester prepared using a diacid such as naphthalenedicarboxylic acid or terephthalic acid as an acid component.

As another reflective polarizer, Patent Documents 2 and 9 disclose a sheet made up of a first transparent resin continuous phase dispersed with particles or other forms of a second transparent resin. The sheet similarly allows polarized light beam (a) to pass through and reflects polarized light beam (b) with polarization perpendicular to that of light beam (a). This sheet is prepared by extrusion molding of a mixture of two different resins.

Patent Documents 3 to 5 disclose a light guide film or sheet to which haze anisotropy is imparted. Because only a light beam with specific polarization diffuses through and emits from the film when non-polarized light is incident on the film end (edge), the light guide may increase the use efficiency of the incident light. The disclosed film is prepared by uniaxial stretching of a polyethylene naphthalate film or the like which contains or is free of a filler.

Patent Document 6 discloses a production method of resin articles for container applications, which involves biaxial stretching of non-oriented crystallized resin (e.g., polyethylene terephthalate resin) sheets.

It is known that luminance at 0° viewing angle (normal-direction luminance) is one of the important characteristics for liquid crystal display devices. Patent Documents 7 and 8 disclose, as a means of improving normal-direction luminance, employing an optical film (e.g., reflective polarizer) having prisms on its surface for adjustment of the light emission angle with respect to the film surface.

[Patent Document 1] Japanese Patent Application Laid-Open (Translation of PCT Application) No. 09-506985
[Patent Document 2] Japanese Patent Application Laid-Open No. 2003-075643
[Patent Document 3] Japanese Patent Application Laid-Open No. 11-281975
[Patent Document 4] Japanese Patent Application Laid-Open No. 2001-264539
[Patent Document 5] Japanese Patent Application Laid-Open No. 2001-49008
[Patent Document 6] Japanese Patent Application Laid-Open (Translation of PCT Application) No. 2005-531445
[Patent Document 7] Japanese Patent Application Laid-Open No. 2007-272052
[Patent Document 8] Japanese Patent Application Laid-Open No. 2007-206569
[Patent Document 9] Japanese Patent Application Laid-Open (Translation of PCT Application) No. 2000-506989

DISCLOSURE OF INVENTION

Problems to be Solved by the Invention

As described above, since the reflective polarizer disclosed by Patent Document 1 is a laminate of multiple films A and B having different chemical structures, it requires a complicated manufacturing method. The complexity has been a hindering factor in the cost reduction. Moreover, in order to impart light diffusion property to the reflective polarizer, it has been necessary to provide an additional light diffusive member or layer onto the reflective polarizer by coating techniques or by bonding. The sheets disclosed by Patent Documents 2 and 9 are made up of polymer alloy, thus requiring a complicated manufacturing method and making fine adjustment of polarization characteristics and light diffusion property difficult.

The films or sheets disclosed by Patent Documents 3 to 5 may be manufactured with a method which allows for relatively easy adjustment of optical characteristics. However, because the films or sheets disclosed by Patent Documents 3 to 5 are merely light guiding members for the light incident on their end (edge), they do not have a function to allow only a light beam with specific polarization to pass through among incident light with different polarizations, nor do they have a function to allow the incident light beam to diffuse through the film. This may be due to low crystallinity and low transmission haze in non-stretched films.

Patent Document 6 discloses stretching crystallized resin films for enhancing transparency; however, sufficient polarization selectivity and light diffusion property are not attained in the stretched films.

The films disclosed by Patent Documents 7 and 8 are made up of two different resins and therefore a complicated manufacturing method is required, making fine adjustment of polarization characteristics and light diffusion property difficult.

There has therefore been a continuing need in the art for the development of films which, when light is incident on the film surface, allow only a light beam with specific linear polarization to pass through and efficiently reflects a light beam with linear polarization perpendicular to that specific linear polarization, i.e., have "polarization selectivity" as well as light diffusion property. However, no films have yet been provided which are satisfactory in terms of both performance and manufacturing easiness.

It is therefore an object of the present invention to provide a film having both polarization selectivity and light diffusion property, and a simple method of manufacturing the same. It is also an object of the present invention to provide a film capable of increasing normal-direction luminance of liquid crystal display devices.

Means for Solving the Problem

A first aspect of the present invention relates to the following polarizing diffuser films.

[1] A polarizing diffuser film made of substantially one kind of crystalline resin having an intrinsic birefringence of 0.1 or more, wherein the film has:
  a total light transmittance to visible light of 50-90%,
  a transmission haze to visible light of 15-90%, and
  a transmission polarization degree to visible light degree of 20-90%.

[2] The polarizing diffuser film according to [1], wherein:
  the film has a crystallinity of 8-40%,
  bright portions and dark portions are observed in a polarization microscopy image of the film observed under crossed Nicol polarizers, the polarization microscopy image taken by irradiating the film with polychromatic light,
  the bright portion and the dark portion are made up of substantially the same composition,
  the bright portions have major axes which are substantially parallel to one another, and
  the bright portions have higher crystallinity and degree of orientation than the dark portions.

[3] The polarizing diffuser film according to [1] or [2], wherein:
  the film has a crystallinity of 8-40%,
  bright portions and dark portions are observed in a polarization microscopy image of the film under crossed Nicol polarizers, the polarization image taken by irradiating the film with polychromatic light,
  the bright portion and the dark portion are made up of substantially the same composition,
  the bright portions have major axes which are substantially parallel to one another,
  where a Raman spectrum is measured at 0.5 μm intervals along a 5 μm-long line passing through the bright portion and dark portion in a cross section of the film substantially parallel to the major axes of the bright portions by irradiation with a light beam with 514.5 nm wavelength by argon ion laser with an argon ion laser Raman spectrophotometer, and then half-value widths of peaks near 1730 cm$^{-1}$ in the respective Raman spectra are plotted against distance from the measurement start point, at least one of the half-value width differences between adjacent local maximum peak and local minimum peak in the plot is 0.2 cm$^{-1}$ or more, and
  where a Raman spectrum is measured at 0.5 μm intervals along a 5 μm-long line passing through the bright portion and dark portion in a section of the film substantially parallel to the major axes of the bright portions by irradiation with two different polarized light beams with 514.5 nm wavelength by argon ion laser with an argon ion laser Raman spectrophotometer, one linearly polarized in parallel to the major axes of the bright portions and the other linearly polarized perpendicularly to the major axes of the bright portions, and then Raman band intensity ratios (Ip/Iv) (where Ip is an intensity of a band near 1615 cm$^{-1}$ in the Raman spectrum for the light linearly polarized in parallel to the major axes of the bright portions, and Iv is an intensity of a band intensity near 1615 cm$^{-1}$ in the Raman spectrum for the light linearly polarized perpendicular to the major axes of the bright portions) are plotted against distance from the measurement start point, at least one of the band intensity ratio differences between adjacent local maximum peak and local minimum peak in the plot is 0.03 or more.

[4] The polarizing diffuser film according to claim 1, wherein:
  the film has a crystallinity of 8-40%,
  the film is a uniaxially stretched film made of crystalline resin having an intrinsic birefringence of 0.1 or more,
  the film has a transmission haze to visible light of 20-90% at 100 μm film thickness,
  a bright-dark structure is observed in a TEM image of a cross section of the film cut perpendicular to the stretching direction of the film (imaged area is 0.1 μm in film thickness direction and has an area of 45 μm$^2$), and
  bright portions and dark portions in the bright-dark structure are made up substantially the same composition.

[5] The polarizing diffuser film according to any one of [1] to [4], wherein the film has a molecular orientation ratio-correction (MOR-c) at 100 μm film thickness of 1.2-7 as measured with a microwave molecular orientation analyzer.

[6] The polarizing diffuser film according to [4], wherein in a binarized image of the bright-dark structure, the area ratio of the bright portions is 6-80%.

[7] The polarizing diffuser film according to any one of [1] to [6], wherein the film has a transmission polarization degree at 100 μm film thickness of 30-90%.

[8] The polarizing diffuser film according to any one of [2] to [7], wherein the film has a crystallinity of 8-30%.

[9] The polarizing diffuser film according to any one of [1] to [8], wherein the crystalline resin is selected from the group consisting of polyester resins, aromatic polyetherketone resins, and liquid crystalline resins.

[10] The polarizing diffuser film according to any one of [1] to [9], wherein the crystalline resin is polyethylene terephthalate resin.

[11] The polarizing diffuser film according to any one of [1] to [10], wherein the film has a light condensable surface shape on at least one surface thereof.

[12] The polarizing diffuser film according to [11], wherein the light condensable surface shape is a surface shape of the polarizing diffuser film itself, or a shape of a resin layer on the polarizing diffuser film.

[13]. The polarizing diffuser film according to [11] or [12], wherein the light condensable surface shape is selected from the group consisting of one-dimensional prisms, two-dimensional prisms, and microlenses.

A second aspect of the present invention relates to the following methods of manufacturing a polarizing diffuser film.

[14] A method of manufacturing a polarizing diffuser film according to any one of [1] to [13], including:

producing a crystallized sheet by heating an amorphous sheet made of crystalline resin having an intrinsic birefringence of 0.1 or more; and substantially uniaxially stretching the crystallized sheet.

[15] The method according to [14], wherein the step of producing a crystallized sheet includes heating the amorphous sheet at temperature T which satisfies the following Inequality (1) until crystallinity of the sheet reaches 3% or higher.

$$Tc-30°C. \leq T < Tm-10°C.  \qquad \text{Inequality (1)}$$

where Tc is a crystallization temperature of the crystalline resin, and Tm is a melting temperature of the crystalline resin.

[16] The method according to [15] or [16], wherein the crystallized sheet has a transmission haze to visible light of 7-70%, and a crystallinity of 3-20%.

A third aspect of the present invention relates to the following liquid crystal display devices which includes the polarizing diffuser film.

[17] A liquid crystal display device including in order:

(A) a surface light source for a liquid crystal display device backlight;

(B) at least one optical device and/or air gap;

(C) the polarizing diffuser film according to any one of [1] to [13]; and (D) a liquid crystal panel which includes a liquid crystal cell sandwiched between two or more polarizing plates.

[18]. The liquid crystal display device according to [17], wherein the polarizing diffuser film is arranged adjacent to the liquid crystal panel.

[19] The liquid crystal display device according to [17] or [18], wherein the polarizing diffuser film also serves as a light source-side protective film for the polarizing plates of the liquid crystal panel.

[20] The liquid crystal display device according to any one of [17] to [18] wherein a polarized-light reflection axis of the polarizing diffuser film is directed in substantially the same direction as an absorption axis of the polarizing plate arranged at the light source-side of the liquid crystal panel.

Advantageous Effect of the Invention

According to the present invention, it is possible to provide a film having both polarization selectivity and light diffusion property, and a simple method of manufacturing the same. Moreover, the present invention can provide a polarizing diffuser film which can enhance the normal-direction luminance of liquid crystal display devices. Thus, it is possible to provide a liquid crystal display device provided with the polarizing diffuser film, which offers high luminance, wide viewing angle, and less luminance unevenness.

BRIEF DESCRIPTION OF DRAWINGS

FIG. 14 shows a table showing measurement results in Examples/Comparative Examples;

FIG. 15 shows a table showing manufacturing conditions for polarizing diffuser films of Examples/Comparative Examples.

FIG. 16 shows a table showing manufacturing conditions for polarizing diffuser films of Examples/Comparative Examples;

FIG. 17 shows a table showing measurements of optical characteristics of polarizing diffuser films of Examples/Comparative Examples;

FIG. 18 shows a table showing measurement results of optical characteristics of polarizing diffuser films of Examples/Comparative Examples;

FIG. 20 shows a table showing measurement results in Examples; and

FIG. 21 shows a table showing measurement results in Comparative Examples.

BEST MODE FOR CARRYING OUT THE INVENTION

Figure 1A:
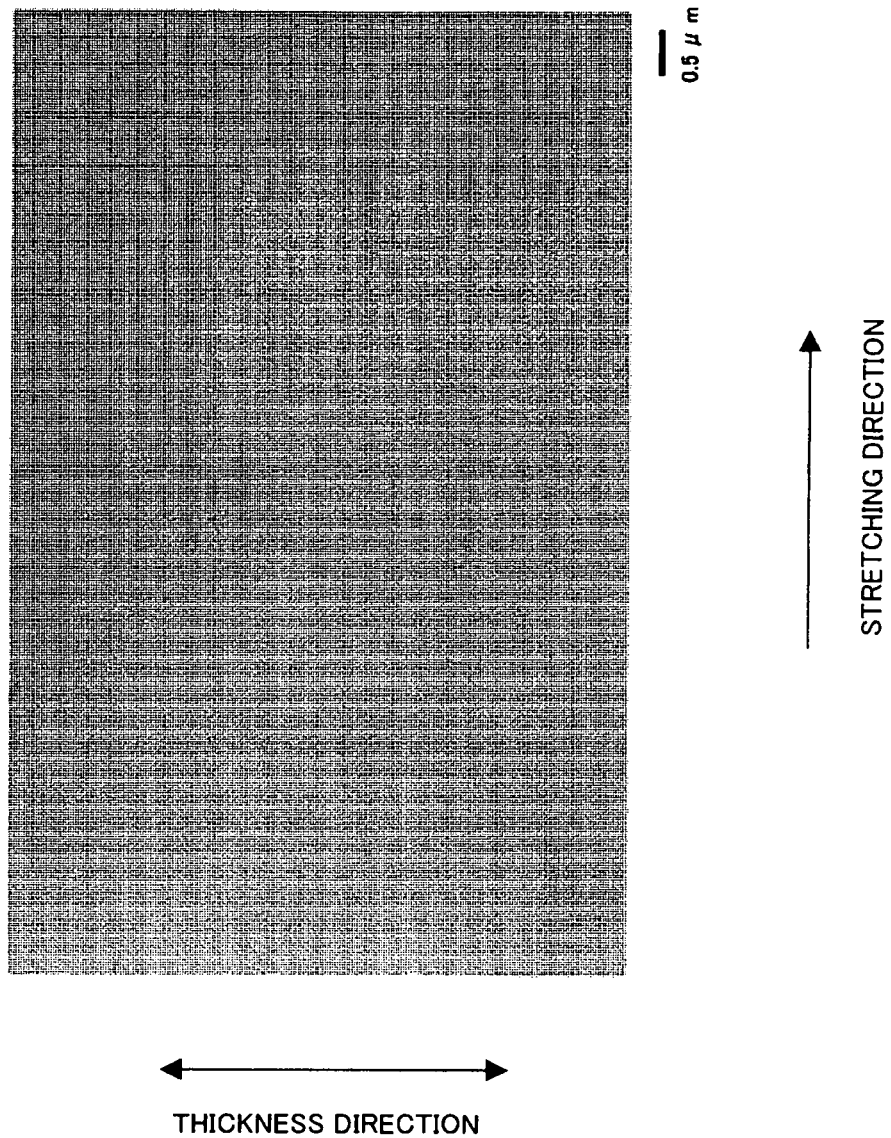
FIG. 1A is a TEM image of a section, cut along the stretching direction, of a polarizing diffuser film according to an embodiment of the present invention.

In the following description the specified numeral range is inclusive. For example, "10-100" specifies a range from 10 or more to 100 or less.

1. Polarizing Diffuser Film

A polarizing diffuser film refers to a film which exhibits both "polarization selectivity" and "light diffusion property." Polarization selectivity refers to the film's property to allow more of a light beam with specific linear polarization to pass through than a light beam with linear polarization perpendicular to that specific polarization, and reflect more of the latter than the former. Light diffusion property refers to the film's property to allow a light beam to diffuse through the film. Specifically, a polarizing diffuser film allows a light beam with specific linear polarization to pass through and diffuse, but can reflect a light beam with polarization perpendicular to the specific linear polarization back to the light-incident side.

The polarizing diffuser film has a certain degree of total light transmittance to visible light. In some embodiments, the polarizing diffuser film has a total light transmittance of 50% or more to visible light, more preferably 65% or more. Preferably, total light transmittance is as high as possible, but it is generally not greater than 90% in view of the occurrence of light reflections on both sides of the film. However, total light transmittance can be enhanced by providing antireflection films or the like.

By setting total light transmittance at 50% or more, liquid crystal display devices equipped with a polarizing diffuser film according to the present invention can exhibit high luminance by the effects of polarization selectivity (polarization reflectivity) and light diffuser property without sacrificing the luminance.

In the present invention, total light transmittance to visible light is luminous total light transmittance which is calculated through the following procedure:

1) A depolarizing plate is placed in front of the sample loading area at the light incident side of the integrating sphere of a spectrophotometer, allowing light to travel to the depolarzing plate surface in the normal direction thereof. This allows non-polarized light to be perpendicularly incident on a surface of a polarizing diffuser film set as a test sample. Light beams with wavelengths of 380-780 nm, which passed through the depolarizing plate, are incident on the film surface, for measurement of total light transmittance at 10 nm wavelength intervals.

2) In accordance with JIS R-3106, averaged luminous total light transmittance (Ttotal) is calculated using the total light transmittance data obtained in 1).

3) The calculated total light transmittance (Ttotal) may be converted to Ttotal@100 μm, which corresponds to total light transmittance (Ttotal) for the film thickness t of 100 μm. Specifically, Ttotal@100 μm is found using the following equation:

$$Ttotal@100 \ \mu m = 100 \times \exp\left\{\frac{100}{t}\text{Ln}\left(\frac{Ttotal}{100}\right)\right\} \quad \text{Equation (1)}$$

Even when the light used for spectrophotometric analysis is somewhat polarized, the depolarizing plate can convert it into randomly polarized light; thus, the film's true performance can be evaluated. Alternatively, when such a depolarizing plate is not used, total light transmittance (Ttotal) can be calculated as follows.

1) Light beams with wavelengths of 380-780 nm are incident on the film surface for measurement total light transmittance at 10 nm wavelength intervals.

2) The film is rotated by 90° in the same plane, and total light transmittance is similarly measured.

3) The total light transmittance values at respective wavelengths in 1) and 2) are averaged to find averaged total light transmittance. Averaged luminous total light transmittance (Ttotal) is then calculated from the averaged total light transmittance.

One example of a measure of the polarization selectivity of the polarizing diffuser film is "transmission polarization degree", a measure which indicates the film's property to selectively allow polarized light beam V or polarized light beam P with polarization perpendicular to that of polarized light beam V to pass through. Specifically, a polarizing diffuser film according to the present invention, which includes a uniaxially stretched resin film as will be described later, has a property to selectively allow more of polarized light beam V with polarization perpendicular to the stretch direction (stretch axis) to pass through than polarized light beam P with polarization parallel to the stretch direction (stretch axis). As used herein "stretch axis" or reflection axis refers to an axis where reflection of a polarized light beam with linear polarization parallel to that axis is favored over reflection of a polarized light beam with polarization perpendicular to that axis.

Transmission polarization degree is found using the following equation:

$$\text{Transmission polarization degree (\%)} = \left(\frac{T_v - T_p}{T_v + T_p}\right)^{\frac{1}{2}} \times 100 \quad \text{Equation (2)}$$

where "Tv" is the total light transmittance (%) for polarized light beam V with polarization perpendicular to the stretch axis, and "Tp" is the total light transmittance (%) for polarized light beam P with polarization parallel to the stretch axis.

A polarizing diffuser film according to the present invention preferably has a transmission polarization degree to visible light of 20% or more, more preferably 30% or more, further preferably 40% or more, but is 90% or less in view of balancing with light diffusion property.

For a polarizing diffuser film according to the present invention, "transmission polarization degree per unit film thickness" is also an important parameter. If the transmission polarization degree per unit film thickness is too low, it may result in the necessity to excessively increase film thickness in order to ensure film's performance. Too high film thickness is undesirable from the viewpoint of film handleability and resin amount required. Thus, transmission polarization degree at the film thickness t of 100 μm, or transmission polarization degree@100 μm, is preferably 30% or more, more preferably 40% or more. Transmission polarization degree@100 μm is found by calculating Tv and Tp at the film thickness of 100 μm (Tv@100 μm and Tp@100 μm) using the following Equations (3) and (4) and by substituting Tv@100 μm and Tp@100 μm into the following Equation (5).

$$Tv@100 \ \mu m = 100 \times \exp\left\{\frac{100}{t}\text{Ln}\left(\frac{Tv}{100}\right)\right\} \quad \text{Equation (3)}$$

$$Tp@100 \ \mu m = 100 \times \exp\left\{\frac{100}{t}\text{Ln}\left(\frac{Tp}{100}\right)\right\} \quad \text{Equation (4)}$$

$$\text{Transmission polarization degree@100 } \mu m \ (\%) = \quad \text{Equation (5)}$$
$$\left(\frac{Tv@100 \ \mu m - Tp@100 \ \mu m}{Tv@100 \ \mu m + Tp@100 \ \mu m}\right)^{\frac{1}{2}} \times 100$$

In particular, when applying the polarizing diffuser film to liquid crystal display devices, it is preferable that total light transmittance Tv for polarized light beam V be at least 10% higher than total light transmittance Tp for polarized light beam P. This allows for better display characteristics in the liquid crystal display device.

Measurement of transmission polarization degree is made through the following procedure:

1) A polarizing plate is placed in front of the sample loading area of the integrating sphere of a spectrophotometer, allowing light from the light source to be emitted in the normal direction to the polarizing plate surface. With this configuration, a linearly polarized light beam with polarization perpendicular to the absorption axis of the polarizing plate can be incident on the set film.

2) A test film is placed in intimate contact with the polarizing plate, and total light transmittance for the incident linearly polarized light beam is measured as follows.

3) Firstly, the stretch axis of the film is made in parallel to the polarization of the incident linearly polarized light beam. Linearly polarized light beams with wavelengths of 380-780 nm are incident on the film for measurement of total light transmittance at 10 nm wavelength intervals. The measured value is divided by the value of total light transmittance of the polarizing plate, and then total light transmittance Tp for the polarized light with polarization parallel to the stretch axis is calculated in accordance with JIS-R3106. The total light transmittance Tp thus calculated may be converted into Tp@100 μm.

4) The film is rotated by 90° in the same plane so that the stretch axis is made perpendicular to the polarization of the linearly polarized light beam incident thereto. As in 3), linearly polarized light beams with wavelengths of 380-780 nm are incident on the film for measurement of total light transmittance at 10 nm wavelength intervals. Similarly, the measured value is divided by the value of total light transmittance of the polarizing plate, and then total light transmittance Tp for the polarized light beam with polarization perpendicular to the stretch axis is calculated in accordance with JIS-R3106. The total light transmittance Tv thus calculated may be converted into Tv@100 μm.

5) Total light transmittances Tp and Tv or Tp@100 μm and Tv@100 μm thus obtained are substituted into Equation (2) or (5) to find transmission polarization degree.

One example of a measure of the light diffusion property of the polarizing diffuser film is the parameter "transmission haze" which is a haze value of the film for transmitted light. A polarizing diffuser film according to the present invention preferably has a transmission haze of 15% or more, more preferably 25% or more to visible light, in order to avoid non-uniform light distribution for uniform luminance when the film is used in the liquid crystal display device. It is also preferable that the transmission haze be not greater than 90% because while a polarizing diffuser film with high transmission haze offers good light diffusion property, too high transmission haze causes luminance reduction due to light loss or the like.

For the polarizing diffuser film, "transmission haze per unit film thickness" is also an important parameter. If transmission haze per unit film thickness is too low, it may result in the necessity to excessively increase film thickness in order to ensure film's performance. Too high film thickness is undesirable from the viewpoint of film handleability and resin amount required, as described above. On the other hand, if transmission haze per unit film thickness is too high, a polarizing diffuser film of desired thickness offers high transmission haze, which may cause luminance reduction in the liquid crystal display device due to light loss or the like. Thus, transmission haze at the film thickness of 100 μm, or transmission haze@100 μm, is preferably 20-90%, more preferably 30-80%.

Transmission haze and transmission haze@100 μm are measured through the following procedure:

1) A depolarizing plate is placed in front of the sample loading area of a spectrophotometer at the light incident side, allowing light from the light source to travel to the depolarizing plate surface in the normal direction thereof. This allows non-polarized light to be perpendicularly incident on a surface of a polarizing diffuser film set as a test sample. Light beams with wavelengths of 380-780 nm, which passed through the depolarizing plate, are incident on the film surface for measurement of parallel light transmittance (Tpara) at 10 nm wavelength intervals.

2) In accordance with JIS R-3106, averaged luminous parallel light transmittance (Tpara) is calculated using the parallel light transmittance data obtained in 1).

3) Transmission haze is found by substituting parallel light transmittance (Tpara) in 2) and total light transmittance (Ttotal) into the following Equation (6).

4) Parallel light transmittance (Tpara) obtained in 2) is converted to parallel light transmittance at 100 μm film thickness, Tpara@100 μm. Specifically, Tpara@100 μm is found using the following Equation (7).

5) Transmission haze at 100 μm film thickness (transmission haze@100 μm) is then found by substituting Tpara@100 μm in 4) and Ttotal@100 μm into the following Equation (8).

$$\text{Transmission haze} = 100 \times (1 - Tpara/Ttotal) \quad \text{Equation (6)}$$

$$Tpara@100 \ \mu m = 100 \times \exp\left\{\frac{100}{t}\text{Ln}\left(\frac{Tpara}{100}\right)\right\} \quad \text{Equation (7)}$$

$$\text{Transmission haze}@100 \ \mu m = \quad \text{Equation (8)}$$
$$100 \times (1 - Tpara@100 \ \mu m/Ttotal@100 \ \mu m)$$

Thus, a polarizing diffuser film according to the present invention can be characterized by the three optical characteristics to visible light—total light transmittance, transmission polarization degree, and transmission haze. Specifically, these optical characteristics are well balanced in the polarizing diffuser film. In particular, the polarizing diffuser film has the advantage of offering a well balance between "transmission haze per unit film thickness" and "transmission polarization degree." This advantage is considered to be achieved by the film's crystallinity and/or mixed structure of a "relatively highly crystalline, relatively highly molecular-oriented portion" and a "relatively less crystalline, relatively less molecular-oriented portion."

Total light transmittance, transmission polarization degree and transmission haze may be measured with, for example, Spectrophotometer U-4100 (Hitachi High-Technologies Corporation) optionally coupled with a 150 mm-diameter integrating sphere attachment.

A polarizing diffuser film according to the present invention includes a crystalline resin film, preferably a crystalline, uniaxially stretched resin film. More preferably, the polarizing diffuser film includes a uniaxially stretched resin film made of substantially one kind of crystalline resin. This is because if the uniaxially stretched resin film is a resin alloy film made of two or more different resins, the film may show an interface generated between different resin phases which are susceptible to separation. In particular, if the different resins are less compatible with each other, resin separation and therefore generation of voids become likely to occur during stretching due to weak adhesion between the resin phases. Such voids induce strong light diffusion that causes light loss; therefore, control of light diffusion property becomes difficult.

As used herein, "crystalline resin" means resin which contains crystalline polymers with a large proportion of crystalline phase. It is preferable that crystalline resins have a certain level of intrinsic birefringence.

"Intrinsic birefringence" is a measure of polymer's molecular orientation, which can be found using the following equation:

$$\Delta n° = (2\pi/9)[(n^2+2)^2/n](N_A \times \rho/M)(\alpha_1 \alpha_2)$$

where $\Delta n°$ is intrinsic birefringence; n is average refraction index; $N_A$ is Avogadro's number; $\rho$ is density; M is molecular weight; $\alpha_1$ is polarizability along the molecular chain direction; and $\alpha_2$ is polarizability along the direction perpendicular to the molecular chain direction.

Resins with high intrinsic birefringence undergo molecular orientation by stretching or other processing and thereby exhibit high birefringence.

Values of intrinsic birefringence of some resins are described in Japanese Patent Application Laid-Open No. 2004-35347, for example. The crystalline resins for uniaxially stretched resin films for the polarizing diffuser film according to the present invention preferably have intrinsic birefringence of 0.1 or greater. Examples of crystalline resins having intrinsic birefringence of 0.1 or greater include polyester resins, aromatic polyetherketone resins, and liquid crystalline resins.

Specific examples of polyester resins having intrinsic birefringence of 0.1 or greater include polyethylene terephthalate, polyethylene-2,6-naphthalate, polypropylene terephthalate and polybutylene terephthalate, with polyethylene terephthalate and polyethylene-2,6-naphthalate being preferable. Additional examples of polyester resins having intrinsic birefringence of 0.1 or greater include copolymers of the foregoing polyester resins, and the foregoing polyester resins modified to contain at least 0.1 mol % of a comonomer such as isophthalic acid, cyclohexandimethanol or dimethyl terephthalate.

Specific examples of aromatic polyetherketone resins having intrinsic birefringence of 0.1 or greater include polyetheretherketone. Specific examples of liquid crystalline resins having intrinsic birefringence of 0.1 or greater include polycondensate of ethylene terephthalate and p-hydroxybenzoate.

The main component of a crystalline resin having intrinsic birefringence of 0.1 or greater is preferably polyethylene terephthalate. Examples of polyethylene terephthalates include polycondensates (homopolymers) of monomer components terephthalic acid and ethylene glycol, and copolymers of terephthalic acid, ethylene glycol and other additional comonomer component(s).

Examples of comonomer components in polyethylene terephthalate copolymers include diols such as diethylene glycol, neopentyl glycol, polyalkylene glycol, 1,3-propanediol, 1,4-butanediol and 1,4-cyclohexanedimethanol; carboxylic acids such as adipic acid, sebacid acid, phthalic acid, isophthalic acid and 2,6-naphthalene dicarboxylic acid; and esters such as dimethyl terephthalate.

The comonomer content in the polyethylene terephthalate copolymer is preferably 5 wt % or less. In general, comonomer components tend to inhibit crystallization; however, when the comonomer content falls within the above range, formation of "bright-dark structure" (later described) is not inhibited. Comonomer components may be relatively predominant in dark portions, which are less crystalline portions, because they tend to inhibit crystallization as noted above. It should be noted that the dark portion and bright portion may have different comonomer contents.

Additional examples of polyethylene terephthalates include, as mixtures of the same kind of polyethylene terephthalate resin, mixtures of the above homopolymers and copolymers; mixtures of the above homopolymers of different molecular weights; and mixtures of the above copolymers of different molecular weights.

Different types of resins which are compatible with polyethylene terephthalate may be additionally added as long as the effects of the present invention are not impaired. Examples of such additional resins include polyethylene naphthalate and polybutylene terephthalate. It should be noted, however, that too much addition may cause resin phase separation. For this reason, the amount of such additional resin is preferably 5 wt % or less based on the polyethylene terephthalate amount. In order to fully avoid the possible phase separation between polyethylene terephthalate and different kind of resin, it is preferable to copolymerize a small amount of comonomer like naphthalene dicarboxylic acid with the polyethylene terephthalate polymer.

Additional components like low-molecular weight waxes, plasticizers, and higher fatty acids and metal salts thereof may be optionally added as long as the effects of the present invention are not impaired. Specifically, during or after polymerization, additives such as nucleating agents, thermal stabilizers, antioxidants, antistatic agents, lubricants, light resistant agents, antiblocking agents, thickeners, ultraviolet absorbers, fluorescent brighteners, pigments, and/or flame retardants may be added.

Nucleating agents may control crystallization rate or crystal size which mainly influences the film's mechanical properties. Namely, the crystallinity of polyethylene terephthalate is substantially determined by the resin type; it is not largely influenced by the addition of additives like nucleating agents. Examples of nucleating agents include phosphoric acid, phosphorous acid and esters thereof; inorganic particles such as silica, kaolin, calcium carbonate, titanium dioxide, bariums sulfate, talc and alumina particles; and various organic particles.

The total amount of the additional components and additives is preferably 5 wt % or less based on the amount of polyethylene terephthalate. Note that when adding trace amounts (e.g., of the order of ppm) of such additional components or additives, compatibility with polyethylene terephthalate is not necessarily required.

A polarizing diffuser film according to the present invention includes the above-described uniaxially stretched resin film. The uniaxially stretched resin film may contain appropriate amounts of known additives such as ultraviolet absorbers for blocking UV light, flame retardants for improving flame retardancy, light resistant agents for improving light resistance, or colorants for adjusting the display quality.

The crystallinity of the uniaxially stretched resin film made of crystalline resin in the polarizing diffuser film is preferably 8-40% for achieving higher film size stability, and is more preferably 8-30% for achieving higher transmission polarization degree as well. The uniaxially stretched resin film subjected to thermal fixing (post-stretching heat treatment for keeping the film stretched) exhibits high crystallinity and somewhat low transmission polarization degree, but have the advantage of less optical characteristics deterioration as well as small size changes after high-temperature storage.

More preferably, the uniaxially stretched resin film made of crystalline resin has a crystallinity of 11-29% in order to obtain the above-described desired values for total light transmittance, transmission haze, and transmission polarization degree.

The crystallinity of the uniaxially stretched resin film is measured by the density method or X-ray diffractometry as with the crystallinity of a non-stretched crystalline resin sheet. The density method is a measuring method of crystallinity based on the resin density. Reference resin densities are described in R. de. P. Daubeny, C. W. Bunn, C. J. Brrown, Proc. Roy. Soc., A226, 531(1954), for example.

Suitable examples of measuring methods of resin density include density gradient tube method, which is defined in JIS-7112 and can be conducted in accordance with JIS-7112 except for the sample solution preparation. Density measurements by the density gradient tube method can be accomplished using a water bath for specific gravity measurement with density gradient method (OMD-6, Ikeda Scientific Co., Ltd.), for example.

Films prepared by uniaxial stretching of crystallized sheets made of crystalline resin show mixed phase of crystalline and amorphous structures. The presence of the mixed phase of "relatively highly crystalline portion" and "relatively highly amorphous, relatively less crystalline portion" in the polarizing diffuser film according to the present invention may be observed by cross-sectional transmission electron microscopy (TEM) of a thin slice of the film. The mixed phase may be observed as "bright-dark structure" in the cross sectional TEM image of the film slice.

Figure 1B:
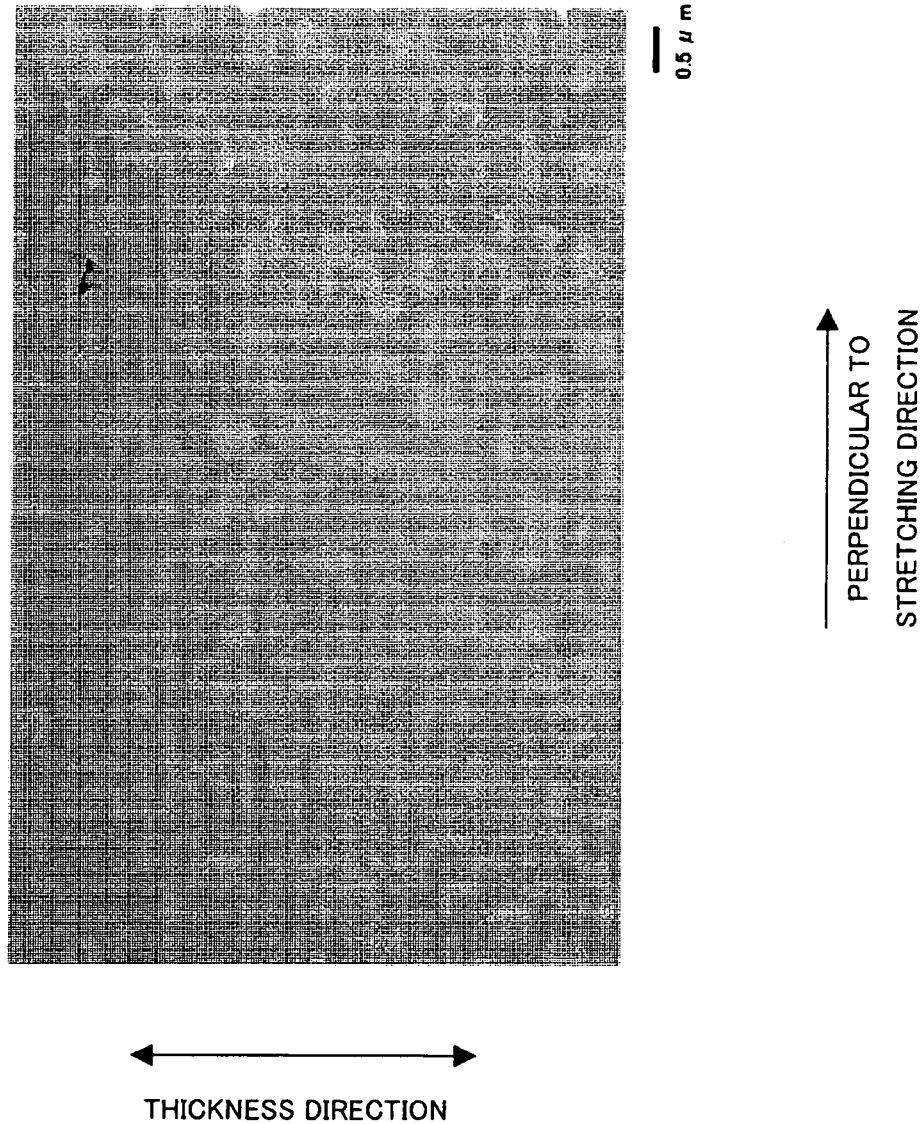
FIG. 1B is a TEM image of a section, cut along the direction perpendicular to the stretching direction, of a polarizing diffuser film according to an embodiment of the present invention.

The "bright-dark structure" observed by TEM refers to a mixed structure of "bright portion" and "dark portion" in the TEM image, more specifically to a sea-island structure consisting of "bright portion" and "dark portion." In the cross-sectional TEM images of a polarizing diffuser film according to the present invention which are illustrated in FIGS. 1A and 1B to be described later, bright portions are considered to correspond to relatively high crystalline portions and dark portions to relatively less crystalline portions. The difference in crystallinity between the bright portion and dark portion in the TEM image can be assessed by micro-Raman spectrometry (resolution: 1 µm) of a film's section covering both bright and dark portions, followed by analysis of the measured Raman spectrum.

The bright portion and dark portion are made up of substantially the same resin (polymer) composition. As used herein, "bright portion and dark portion are made up of substantially the same resin composition" means that the respective components of the bright and dark portions are resin components made up of substantially the same composition; the resin which constitutes the bright portion is free of resin particles or fillers which are made up of different composition than the resin constituting the dark portion.

FIG. 1A is a cross-sectional TEM image of a polarizing diffuser film cut along the stretching direction, and FIG. 1B is a cross-sectional TEM image of a polarizing diffuser film cut along the direction perpendicular to the stretching direction. In FIGS. 1A and 1B, the image area is 0.1 µm in the film thickness direction and has an area of 45 µm². In the cross-sectional TEM image in the stretching direction, bright portions elongated in the stretching direction are observed (see FIG. 1A). In the cross-sectional TEM image cut along the direction perpendicular to the stretching direction, on the other hand, "islands" of bright portions with undefined shape or bright portions somewhat elongated in the plane direction of the film surface are observed (see FIG. 1B).

In the cross-sectional TEM image shown in FIG. 1B, the length of the major axis of the bright island portion is not specifically limited; it is preferably 100 nm or more in view of accomplishing optical effects, and is most preferably 100 nm to 20 µm. It should be noted that there is no problem if islands of bright portion which are less than 100 nm in major axis exist.

Figure 1C:
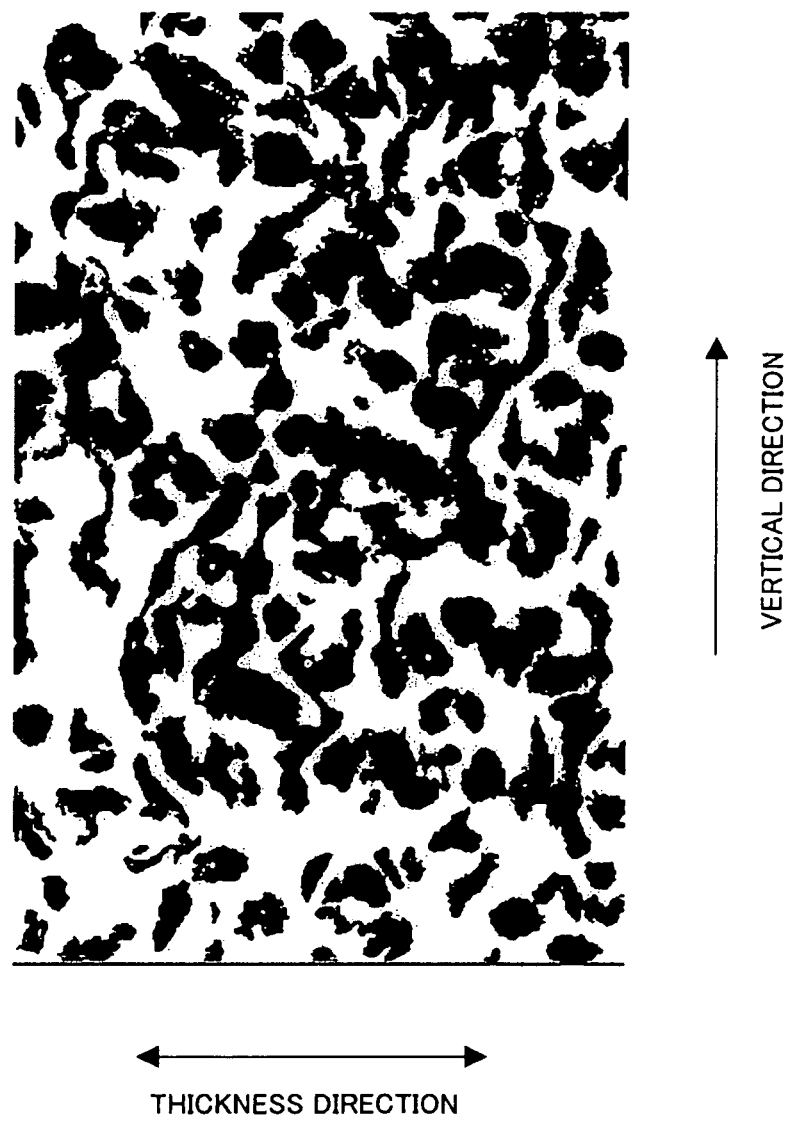
FIG. 1C is a binarized image of the TEM image shown in FIG. 1B.

In a binarized image (see FIG. 1C), which is a binarized image of a cross-sectional TEM image of a polarizing diffuser film according to the present invention cut along the direction perpendicular to the stretching direction (see FIG. 1B), the area ratio of the portions which correspond to bright portions of the TEM image of a polarizing diffuser film is preferably 6-80%, more preferably 10-75%, further preferably 30-60%. In FIG. 1C, "bright portion" and "dark portion" respectively correspond to "dark portion" and "bright portion" in FIG. 1B. The fact that FIG. 1C is a binarized image in which bright and dark portions are displayed in reverse video is seen from the comparison between the TEM image of FIG. 1B and binarized image of FIG. 1C. More specifically, this is clear from the fact that, when superimposing the TEM image on the binarized image, the bright portions and dark portions of the TEM image are respectively superimposed on (correspond to) the dark portions and bright portions of the binarized image. In this specification and the attached claims, "bright portion in a banarized image of a bright-dark structure" corresponds to bright portion of TEM image.

The bright portions and dark portions in the TEM images are considered to have different resin density and/or crystallinity, although the reason for this is not necessarily clear. This difference may in turn lead to differences in their refractive index, molecular orientation, and birefringence.

When bright portions are observed as being dispersed in a matrix of dark portion in a cross-sectional TEM image of the film, the difference in refraction index between the bright portion resin and dark portion resin causes light reflections or light diffusion at their interface. Thus, when bright portions are adequately dispersed in the cross-sectional TEM image, the films may have an appropriate value of transmission haze.

The "bright portion" and "dark portion" in the TEM image exhibit different molecular orientation ratios due to the differences in their resin density and crystallinity, leading to birefringence difference between them after stretching. As a result, the film's refractive-index difference between in the "bright portion" and the "dark portion" differs between the direction parallel to the stretching direction and the direction perpendicular to the stretching direction. Thus, reflectivity difference and light diffusion property difference occur between a light beam with linear polarization parallel to the stretching direction and a light beam with linear polarization perpendicular to the stretching direction. Crystalline resins with positive birefringence like polyethylene terephthalate tend to reflect and diffuse more of a light beam with linear polarization parallel to the stretching direction, because the refractive index difference in the direction parallel to the stretching direction becomes larger than the refraction index difference in the direction perpendicular to the stretching direction.

The larger the interfaces between bright and dark portions in a cross-sectional TEM image, the greater the difference in light reflection amount and light diffusion amount between a light beam with linear polarization parallel to the stretching direction and a light beam with linear polarization perpendicular to the stretching direction. If the areas of bright portions are too large or if some of the bright portions are combined together to form larger bright portions, the interfaces between the bright and dark portions become small. On the other hand, if the interfaces between the bright and dark portions are too large, excess light diffusion occurs that results in light loss or disturbance of polarized light. Thus, it is important that the bright portions be dispersed in an appropriate amount as well as in appropriate shape when observed in a cross-sectional TEM image.

A cross-sectional TEM image of a uniaxially stretched resin film is prepared as follows. First, a uniaxially stretched resin film is sliced to prepare a thin slice sample. The sample is sliced such that the cut surface is perpendicular to the stretching direction of the uniaxially stretched film and is in parallel to the film thickness direction. The thin slice sample is prepared using general techniques. For example, a film sample embedded in resin is fixed to a sample holder of a ultramicrotome, trimmed using a shaver, planed using a glass knife or artificial sapphire knife, and cut into slices of 0.1-1 µm thickness using a diamond knife of the ultramicrotome.

The obtained thin slice samples are optionally stained, e.g., by placing them in a staining pod containing ruthenium tetroxide crystals followed by vapor staining for about 2 hours.

Sections of stained or non-stained thin slice samples are then imaged with a transmission electron microscope to obtain TEM images (end-view images). Examples of transmission electron microscopes include H-7650 manufactured by Hitachi High-Technologies Corporation. Accelerating voltage is preferably set in the range of several tens to 100 kV. Magnification is set at about 1,000× to 4,000×, for example. Observation area is preferably set at 5-10,000 µm$^2$, more preferably 10-1000 µm$^2$. TEM images are output at a magnification of about 5,000× to 50,000×.

Luminance is measured for each pixel in the output TEM image, and average luminance of the image is calculated. Herein, the ratio of the number pixels exhibiting luminance higher than the average value to the total number of pixels is defined as "area ratio of bright portions."

Image processing is accomplished using generally-available image analysis software (e.g., ImageJ 1.32S developed by Wayne Rasband). Specifically, the output TEM image is converted into a general digital image file format (e.g., JPEG) with a grayscale of, for example, 256 tones. The grayscale level is measured for each pixel, creating a histogram showing the number of pixels in the image at each different grayscale level. An average grayscale level of the image is found using the histogram. The image is binarized with the average grayscale level as a threshold grayscale value, with pixels at or above threshold (i.e., light) set to "1" and below (i.e., dark) to "0." A ratio of the number of pixels assigned "1" to the total number of pixels was calculated to find as the area ratio of bright portions.

In some cases, a TEM image which actually has a uniform luminance distribution is erroneously produced as a TEM image of non-uniform luminance distribution depending on the TEM condition or due to factors associated with displaying. For example, there is a case where a TEM image which actually has a uniform luminance distribution is output as: a TEM image whose right half area and left haft area exhibit different luminance; a TEM image in which luminance shows gradual increase from the left side to right side across the image; and so forth. In such cases, for calculating the area ratio of bright portions, creation of the histogram data, calculation of average grayscale level, and binary processing are preferably preceded by background correction.

In a polarizing diffuser film according to the present invention, the presence of the mixed phase of a "relatively highly crystalline portion" and a "relatively highly amorphous, relatively less crystalline portion" may also be observed as "bright-dark structure" in a polarization microscopy image as observed in the crossed Nicol configuration. In the polarization microscopy image shown in FIG. 2A observed under crossed Nicol polarizers, the "bright portion" corresponds to a "relatively highly crystalline portion" and the "dark portion" to a "relatively less crystalline portion." The difference in crystallinity and in degree of orientation between the bright portion and dark portion in the polarization microscopy image as observed under crossed Nicol polarizers can be assessed by micro-Raman spectrometry (resolution: 1 µm) of a film's cross section covering both bright and dark portions, followed by analysis of the measured Raman spectrum.

The bright portion and dark portion are made up of substantially the same resin (polymer) composition as are the bright and dark portions observed in the above TEM image. As used herein, "bright portion and dark portion are made up of substantially the same resin composition" means that the respective components of the bright and dark portions are resin components made up of substantially the same composition.

Figure 2A:
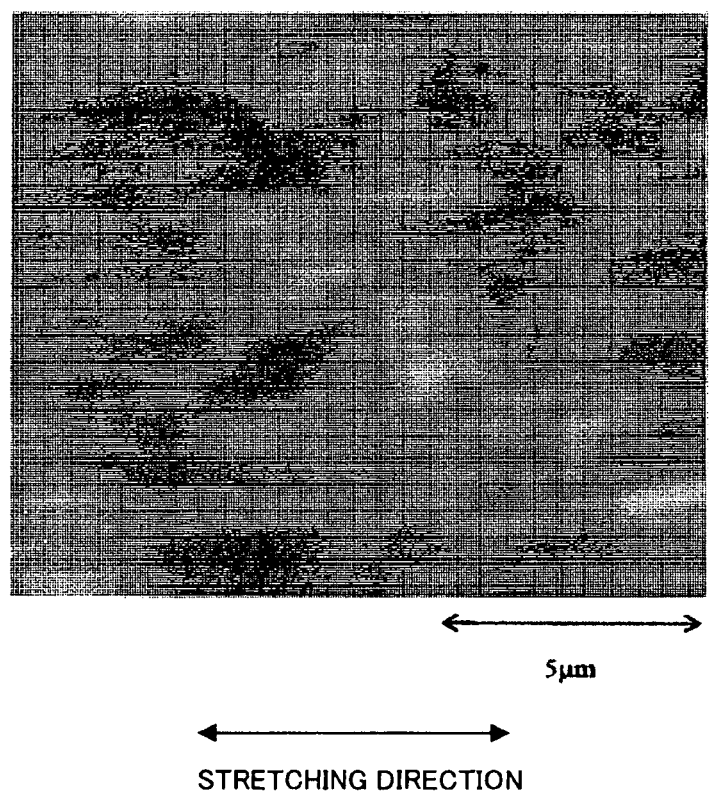
FIG. 2A is a polarization microscopy image of a section, cut along the stretching direction, of a polarizing diffuser film according to an embodiment of the present invention.

FIG. 2A shows a cross-sectional polarization microscopy image of a uniaxially stretched crystalline resin film observed under crossed Nicol polarizers (observation area: about 200 µm$^2$), wherein a section of the film parallel to the stretching direction is irradiated with polychromatic light for observation. As shown in FIG. 2A, the cross-sectional polarization microscopy image of the film includes "bright portions" which look relatively bright and "dark portions" which look relatively dark. The bright and dark portions may constitute "sea-island structure." The bright portions may be formed as islands which are mainly elongated in the stretching direction.

In polarization microscopy images as observed under crossed Nicol polarizers (including orthogonal Nicol arrangement), portions which look relatively bright (bright portions) tend to exhibit high crystallinity and high degree of orientation, whereas portions which look relatively dark (dark portions) tend to exhibit low crystallinity and low degree of orientation. Specifically, the bright portions have higher crystallinity and higher degree of orientation than the dark portions. High crystallinity facilitates orientation of the bright portions, and high degree of orientation leads to high birefringence. Thus, "the bright portions have higher crystallinity and higher degree of orientation than the dark portions" means that "the bright portions have higher birefringence than the dark portions."

Thus, the "bright portions" in the TEM image shown in FIG. 1B correspond to those of the polarization microscopy image shown in FIG. 2A, and the "dark portions" in the TEM image shown in FIG. 1B substantially correspond to those of the polarization microscopy image shown in FIG. 2A.

The polarization microscopy images are observed with NIKON OPTIPHOT-2 Microscope having crossed polarizers (polarizing films) respectively at light incident side and observation light side of the object. Polarization images are taken with CANON PowerShot A650 (×100 objective lens) at 1,000× magnification.

A polarization microscopy image of a uniaxially stretched resin film can be taken by directly imaging the film surface. However, in order to obtain a polarization microscopy image with high accuracy, it is preferable to prepare a thin slice film sample by slicing the uniaxially stretched resin film such that the cut surface is in parallel to the stretching direction as well as with the film thickness direction. The thin slice sample can be prepared using the same general method as described above. The thickness of the slice which has cut surfaces along the film stretching direction is preferably 0.5-2 µm for facilitating the observation of the bright-dark structure. Moreover, considering the fact that Raman analysis's spatial resolution limit is 1 μm, the slice thickness is more preferably 1-2 μm, further preferably 1 μm.

"Under crossed Nicol polarizers" as used herein refers to a polarizer arrangement where two polarizers which sandwich the film sample are so arranged that their polarizing axes intersect (as opposed to "under parallel Nicol polarizers"). The intersecting angle of the polarizing axes is optimized for maximum image contrast; it is preferable to observe contrast images at the found optimal intersecting angle (e.g., 90°).

The crystallinity distribution and degree of orientation distribution across a polarizing diffuser film according to the present invention may be measured by line analysis of a film's section by laser Raman spectrometry, which includes linearly scanning the section with a laser Raman spectrometer in the direction perpendicular to the stretching direction (i.e., substantially perpendicular to the major axis of the bright portion). More specifically, the film's crystallinity distribution can be measured based on argon-ion laser Raman spectra of the film's section irradiated with a light beam with 514.5 nm wavelength. The film's degree of orientation distribution can be measured based on argon-ion laser Raman spectra of the film's section irradiated with two different light beams with 514.5 nm wavelength, one linearly polarized parallel to the stretching direction and the other linearly polarized perpendicularly to the stretching direction.

Line analysis refers to measurement of a laser Raman spectrum at given intervals on the sample, which involves linearly sweeping a laser Raman spectrophotometer over the sample. The line to be scanned by the spectrophotometer only needs to run in a direction substantially perpendicular to the stretching direction (major axes of bright portions), as well as cover at least bright portions and dark portions. Thus, it is preferable to determine scanning lines to be subjected to Raman spectrometry after confirming the presence of the bright-dark structure by polarization microscopy.

Figure 2B:
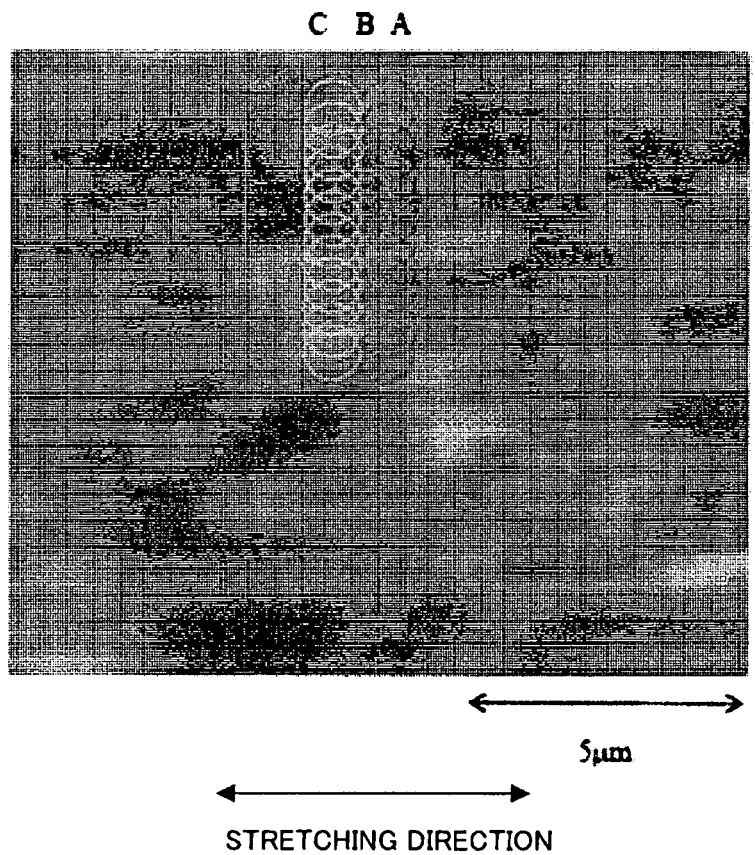
FIG. 2B shows a portion of the section shown in FIG. 2A, where line Raman analysis was conducted using a Raman spectrometer.

On lines A to C shown in the polarization microscopy image of FIG. 2B, a portion around 0-1.5 μm away from the measurement start position looks relatively bright (bright portion), and a portion around 3-4 μm away from the measurement start point looks relatively dark (dark portion). Lines A, B and C denote scanning lines spaced at 1 μm apart in the stretching direction.

Figure 3A:
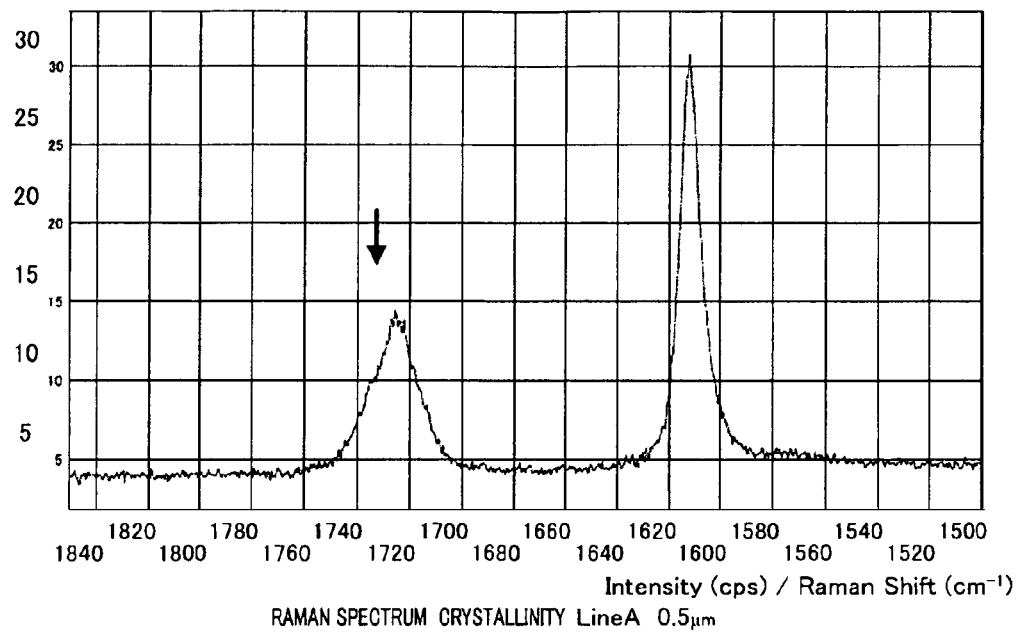
FIGS. 3A and 3B each show a Raman spectrum for one measurement site shown in FIG. 2B.
Figure 3B:
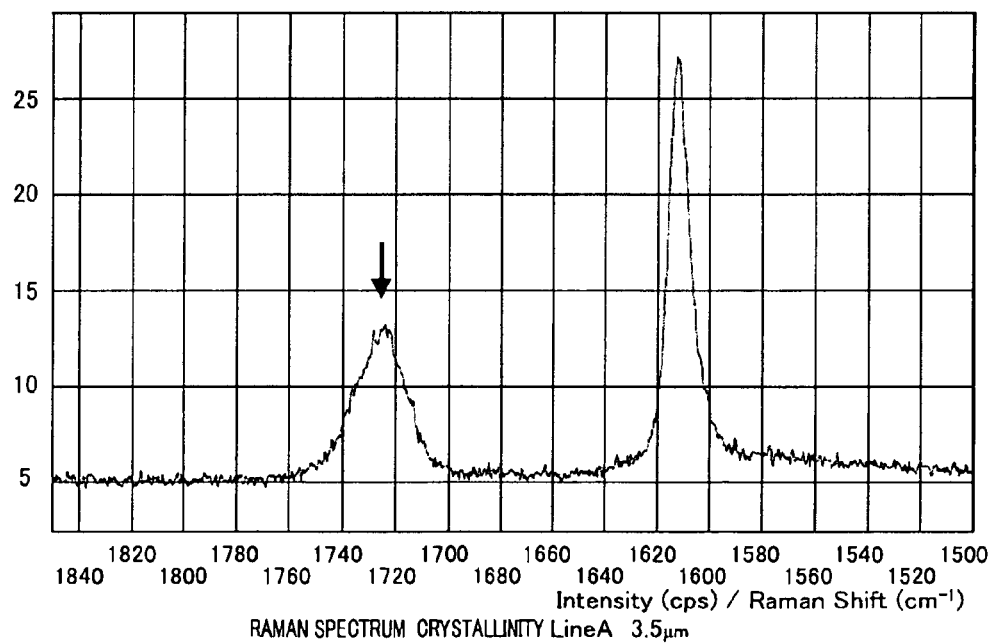

The measurement method of crystallinity distribution will be described below. FIG. 3A shows a Raman spectrum observed with 514.5 nm light beam at a distance 0.5 μm away from the measurement start point on line A shown in FIG. 2B. FIG. 3B shows a Raman spectrum observed at a distance 3.5 μm away from the measurement start point on line A under the same condition. As shown in FIGS. 3A and 3B, in each Raman spectrum, a peak derived from a benzene ring double bond is observed near 1615 cm$^{-1}$, and a peak derived from an ester carbonyl group is observed near 1730 cm$^{-1}$.

Crystallinity may be evaluated based on the half-value width of the peak near 1730 cm$^{-1}$ which is derived from the ester carbonyl group, because there is a clear inverse proportional relationship between crystallinity and the half-value width of the peak near 1730 cm$^{-1}$. The half-value width refers to the peak width at half maximum intensity. As the crystallinity increases, the peak becomes sharper and narrower and therefore the half-value width becomes small. The crystallinity distribution may be evaluated by analyzing the Raman spectra measured at given intervals along the scanning line running perpendicularly to the stretching direction.

Figure 4:
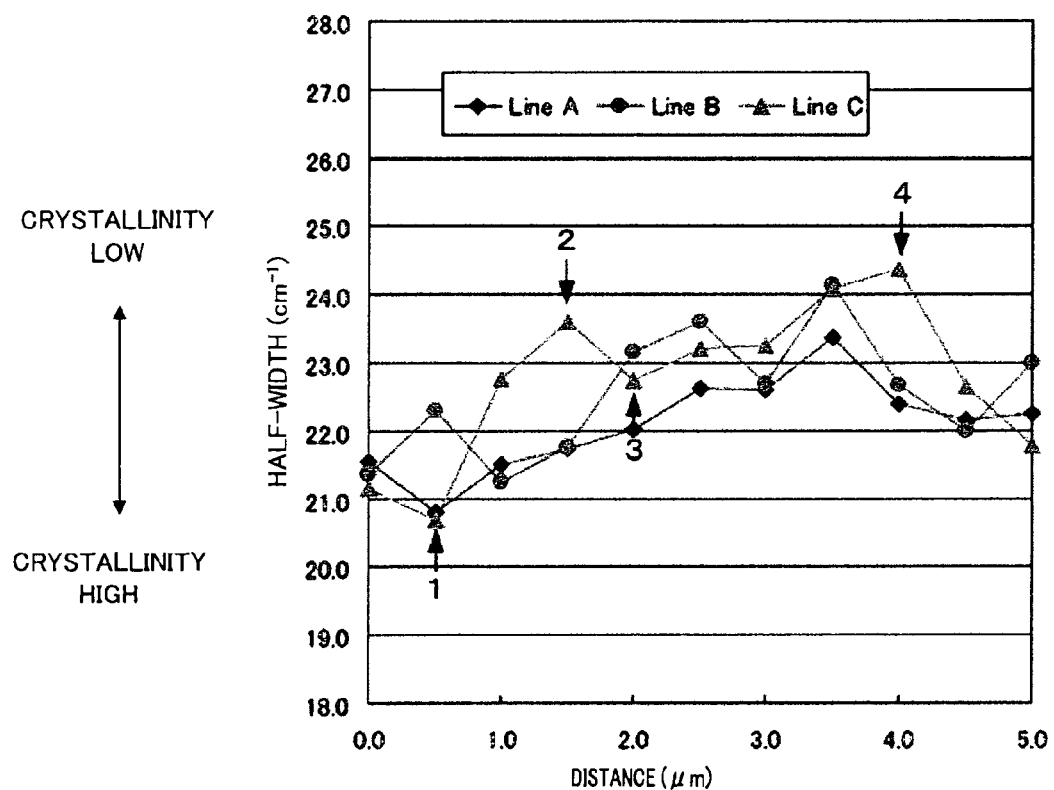
FIG. 4 is a plot of half-value width of a peak near 1730 $cm^{-1}$ vs. distance from the measurement starting point in FIG. 2B.

FIG. 4 shows a plot of half-value width of a peak near 1730 cm$^{-1}$ against distance from the measurement start point with 0.5 μm intervals on lines A to C shown in FIG. 2B. The graph demonstrates that the smaller the half-value width, the higher the crystallinity becomes, and vice versa.

Referring to FIG. 4, it is suggested that the half-value width is small and thus crystallinity is high near measurement positions 0-1.5 μm away from the measurement start position in the case of lines A and B. It is also suggested that in the case of line C the half-value width is small and thus crystallinity is high near measurement positions 0-1 μm away from the measurement start point. On the other hand, it is suggested that the half-value width is large and thus crystallinity is low near measurement points 3-4 μm away from the measurement start point for lines A to C. The half-value width difference between any adjacent local maximum peak and local minimum peak on the graphs is shown to be not less than 0.9 cm$^{-1}$ within the measurement range (0-5 μm). In FIG. 4, for example, the local maximum peaks and local minimum peaks on the line C are denoted by arrows 1 to 4. The half-value width differences between adjacent local maximum peak and local minimum peak—the half-value width difference between local minimum peak 1 and local maximum peak 2, the half-value width difference between local maximum peak 2 and local minimum peak 3, and the half-value width difference between local minimum peak 3 and local maximum peak 4—are calculated. Thus, "the presence of bright and dark portions" as used herein means that, in a plot of h half-value width of a peak near 1730 cm$^{-1}$ against distance from the measurement start point, at least one of the half-value width differences between adjacent local maximum peak and local minimum peak is 0.2 cm$^{-1}$ or more, more preferably 0.5 cm$^{-1}$ or more, further preferably 1.5 cm$^{-1}$ or more, more further preferably 2 cm$^{-1}$ or more.

Figure 5A:
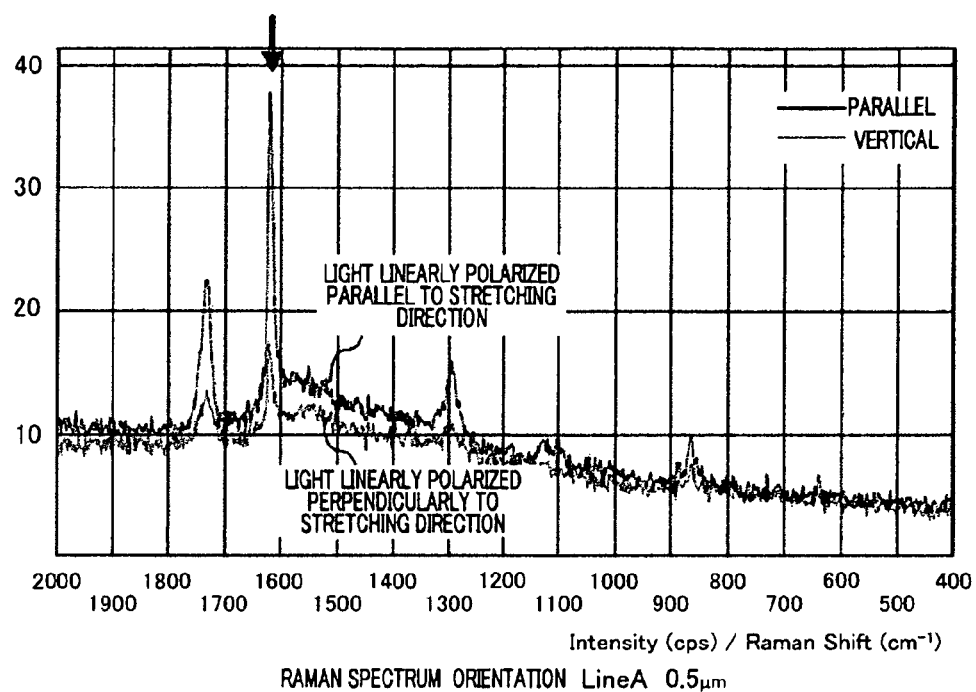
FIGS. 5A and 5B each show a Raman spectrum for one measurement site in FIG. 2B.
Figure 5B:
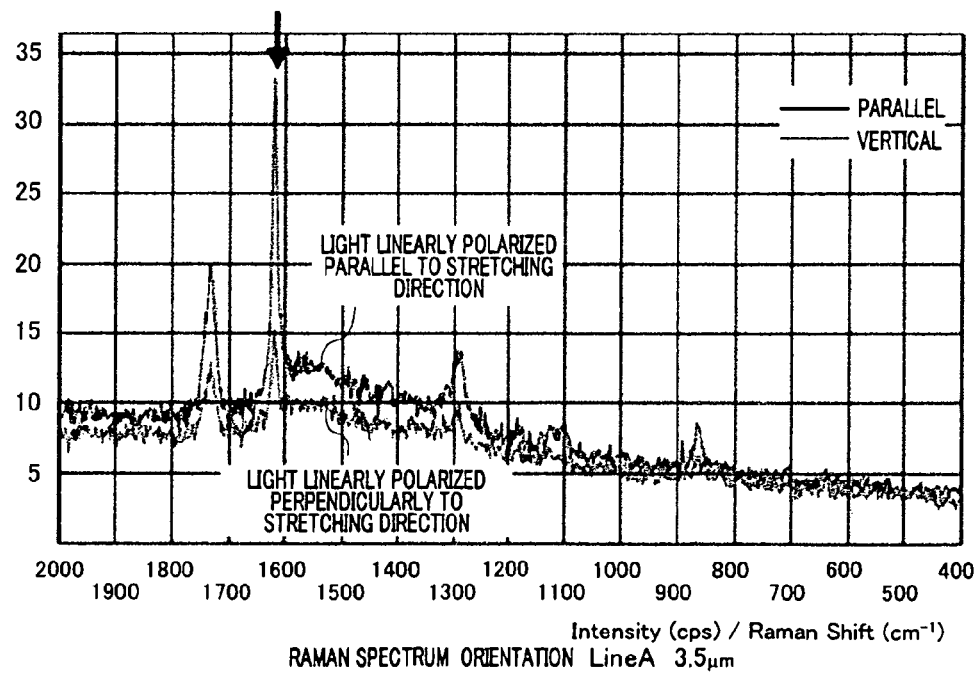

Next, the measurement method of degree-of-orientation distribution will be described below. FIG. 5A shows Raman spectra observed with two different light beams, one linearly polarized in parallel to the stretching direction and the other linearly polarized perpendicular to the stretching direction, at a distance 0.5 μm away from the measurement start point on line A shown in FIG. 2B. FIG. 5B shows Raman spectra observed at a distance 3.5 μm away from the measurement start point under the same condition.

The degree of orientation may be evaluated based on the band intensity anisotropy for a benzene ring double bond peak appearing near 1615 cm$^{-1}$, because the band near 1615 cm$^{-1}$ has a transition moment directed along the major axis of the terephthalic acid unit. As used herein, band intensity anisotropy refers to the band intensity ratio Ip/Iv, where Ip is a band intensity as measured using a light beam linearly polarized parallel to the stretching direction, and Iv is a band intensity as measured using a light beam linearly polarized perpendicular to the stretching direction. The band intensity is a maximum intensity of a band near 1615 cm1$^{-1}$. The degree of orientation increases with increasing band intensity ratio (Ip/Iv). The degree of orientation may be evaluated by analyzing the Raman spectra measured at given intervals along the scanning line running perpendicularly to the stretching direction.

Figure 6:
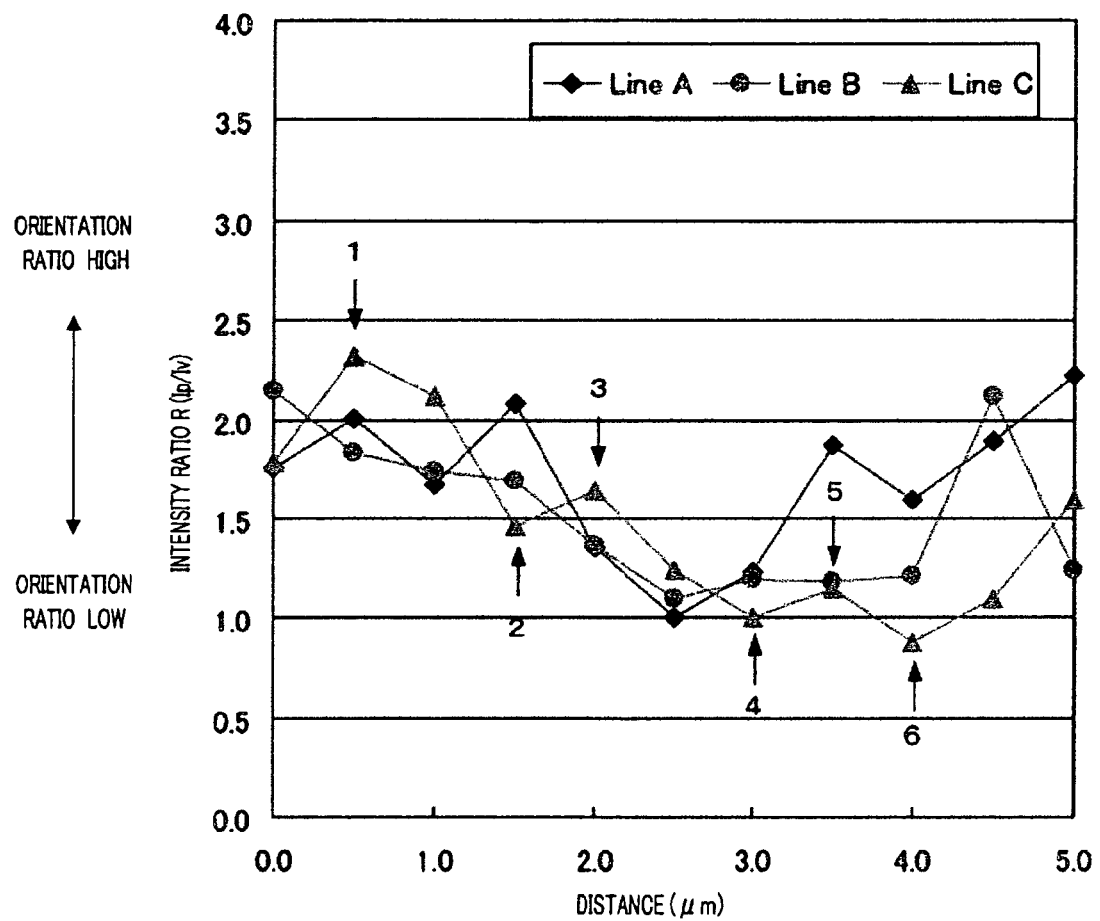
FIG. 6 is a plot of half-value width of a peak near 1615 $cm^{-1}$ vs. distance from the measurement starting point in FIG. 2B.

FIG. 6 shows plots of band intensity ratio (Ip/Iv) for the band near 1615 cm$^{-1}$ against distance from the measurement start point measured at 0.5 μm intervals for lines A to C in FIG. 2B. The graph indicates that the smaller the band intensity ratio, the smaller the degree of orientation, and vice versa.

Referring to FIG. 6, it is suggested that the band intensity ratio (and therefore degree of orientation) are relatively high near measurement positions 0-1.5 μm away from the measurement start position in the case of lines A and B. In the case of line C, the band intensity ratio (and therefore degree of orientation) is relatively high near measurement positions 0-1 µm away from the measurement start point. On the other hand, it is suggested that the band intensity ratio and therefore degree of orientation are small at measurement positions 3-4 µm away from the measurement start point for lines A to C. The band intensity ratio difference between any adjacent local maximum peak and local minimum peak on the graphs is shown to be not less than 0.09 within the measurement range (0-5 µm). In FIG. 6, for example, the local maximum peaks and local minimum peaks on the line C are denoted by arrows 1 to 6. The band intensity ratio differences between the adjacent local maximum peak and local minimum peak—the band intensity ratio difference between local maximum peak 1 and local minimum peak 2, the band intensity ratio difference between local minimum peak 2 and local maximum peak 3, the band intensity ratio difference between local maximum peak 3 and local minimum peak 4, the band intensity ratio difference between local minimum peak 4 and local maximum peak 5, and the band intensity ratio difference between local maximum peak 5 and local minimum peak 6—are calculated. Thus, "the presence of bright and dark portions" as used herein means that, in a plot of band intensity ratio (Ip/Iv) near 1615 $cm^{-1}$ against distance from the measurement start point, at least one of the band intensity ratio differences between adjacent local maximum peak and local minimum peak is 0.03 or more, preferably 0.08 or more, more preferably 0.7 or more, further preferably 1 or more.

More preferably, "the presence of bright and dark portions" as used herein means that at least one of the half-value width differences between local maximum peak and local minimum peak for the peak 1730 $cm^{-1}$ is 0.2 $cm^{-1}$ or more, and that at least one of the band intensity ratio (Ip/Iv) differences between adjacent local maximum peak and local minimum peak for the peak near 1615 $cm^{-1}$ is 0.03 or more.

Thus, referring to the polarization microscopy image of FIG. 2B, it is confirmed that a relatively bright portion (corresponding to measurement positions about 0-1.5 µm or about 0-1 µm away from the measurement start point) exhibits high crystallinity and high degree of orientation, whereas a relatively dark portion (corresponding to measurement positions about 3-4 µm away from the measurement start point) exhibit low crystallinity and low degree of orientation.

Raman spectra may be observed with any known laser Raman spectrometer, e.g., Ramanor T-64000 (Jobin Yvon/Atago Bussan Co., Ltd.). As a film sample, a 1 µm-thick slice of a polarizing diffuser film cut along the film's stretching direction is used. The film sample may be then measured for Raman spectra by laser Raman spectrometry under the following condition: Beam spot: 1 µm; cross slit: 100-200 µm; and light source: Argon-ion laser (wavelength: 514.5 nm, output: 5-30 mW).

Aside from the above-described degree of orientation for microscopic structure, Molecular Orientation Ratio (MOR) is available as a measure of molecular orientation of a uniaxially stretched film as a whole. MOR indicates the degree of orientation of molecules and can be measured by the microwave measurement method like that described below.

Specifically, a sample (film) is inserted into a pair of microwave resonance waveguides of any known microwave molecular orientation analyzer in such a way that microwaves are vertically incident to the film surface. The film is then continuously irradiated with polarized microwaves while being rotated at different angles around its central axis normal to the film surface, measuring the intensities of the microwaves passed through the sample to find a molecular orientation ratio.

"Molecular orientation ratio-correction (MOR-c)" as used herein is a value of MOR measured at a reference film thickness tc of 100 µm, and can be found using the following equation:

MOR-$c=tc/t$(MOR$-1$)$+1$ where tc is reference film thickness, and t is actual sample thickness MOR-c can be measured within a resonant frequency range of 12.54-12.56 MHz with any known molecular orientation analyzer, e.g., microwave molecular orientation analyzer MOA-2012A or MOA-6000 (Oji Scientific Instruments).

Figure 7:
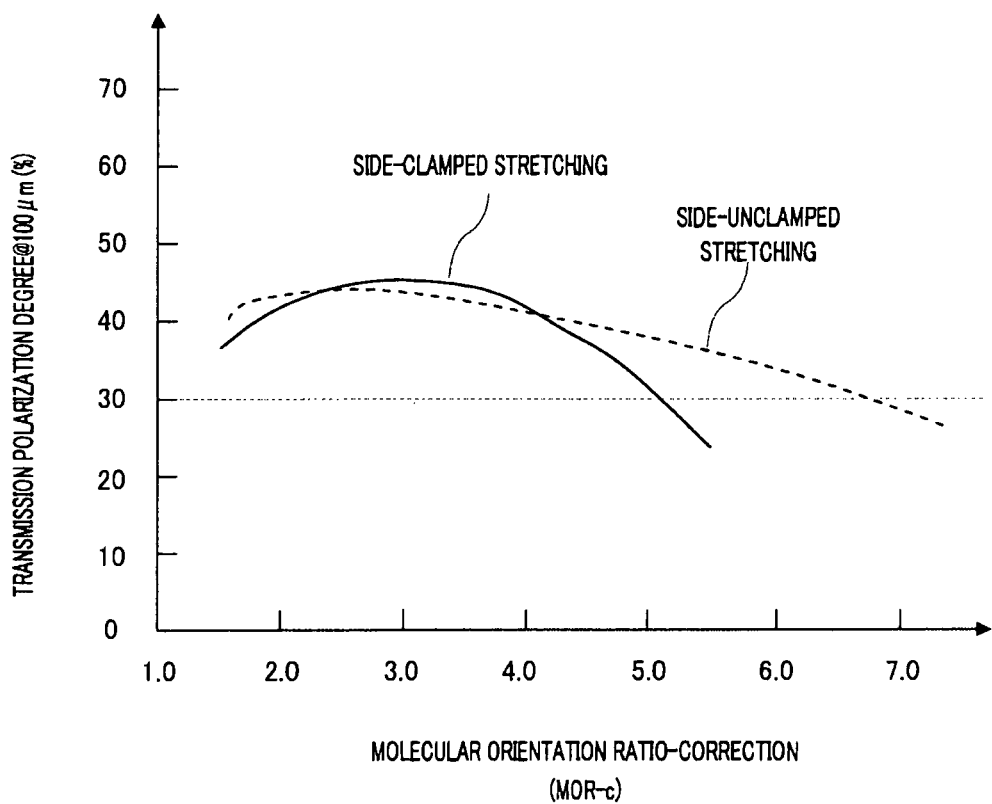
FIG. 7 is a graph showing an example of plots of transmission polarization degree vs. molecular orientation ratio-correction (MOR-c)

FIG. 7 is a graph of an example of plots of transmission polarization degree@100 µm against molecular orientation ratio-correction (MOR-c) for a uniaxially stretched crystalline resin film. As shown in FIG. 7, in order to achieve a transmission polarization degree of 30% or more, uniaxially stretched crystalline resin films stretched in a longitudinal direction with the transverse sides clamped preferably have an MOR-c of 1.5-5.1, and uniaxially stretched crystalline resin films stretched in a longitudinal direction without the transverse sides clamped preferably have an MOR of 1.2-7. If the MOR-c is too low, it results in failure to ensure sufficient transmission polarization degree due to insufficient film molecular orientation as a whole. On the other hand, if the MOR-c is too high, it results in failure to obtain degree of orientation difference and thus birefringence difference between bright and dark portions due to undesired orientation of less crystalline portions. Thus, it is difficult to obtain desired transmission polarization degree.

As will be described later, MOR-c may be controlled mainly by heat treatment condition (heat temperature and heat treatment time before stretching) and stretching condition (stretching temperature and stretching rate), for example.

2. Manufacturing Method of Polarizing Diffuser Film

A uniaxially stretched crystalline resin film may be manufactured, for example, through a process which includes the steps of: (1) providing a crystallized sheet made of crystalline resin; and (2) stretching the crystallized resin sheet mainly uniaxially. In order to control MOR-c, it is important to adjust "heat treatment temperature" and "heat treatment time" in step (1) and "stretching temperature" and "stretching rate" in step (2).

As described above, crystalline resins to be employed preferably have an intrinsic birefringence of 0.1 or more. Among them, it is preferable to employ polyethylene terephthalate or polyethylene naphthalate in view of their high processability, good optical characteristics, and cost effectiveness. Commercially available crystalline resin sheets may also be employed. Alternatively, crystalline resin films prepared by known film formation methods, e.g., extrusion molding, may be employed. The crystalline resin sheets may have either single-layered or multi-layered structure.

It is only necessary for these crystallized resin sheets to have a certain level of crystallinity, for example, 3-20%. Resin sheets with excessively high crystallinity may contain larger crystal particles which may prevent ensuring desired optical characteristics that allow uniaxially stretched crystalline resin sheets to serve as polarizing diffuser films. Furthermore, due to excessively high crystallinity, film stretching itself may be difficult to be effected.

The crystallized sheet made of crystalline resin can be prepared by crystallizing an amorphous resin sheet by heat treatment. Specifically, a resin sheet obtained by crystallizing an amorphous resin sheet by heat treatment may be attached to a stretcher for stretching (off-line heat treatment). Alternatively, an amorphous resin sheet, a resin sheet not crystallized by heat treatment, may be attached to a stretcher, where it is heated and is immediately followed by stretching (in-line heat treatment).

Heat treatment temperature (T) at which an amorphous resin sheet is crystallized is not specifically limited; however, preferably, it is either set between glass transition temperature Tg and melting temperature Tm of the crystalline resin or satisfies the following relationship:

$$Tc-30°\text{ C.} \leq T < Tm-10°\text{ C.}$$

where Tc is the crystallization temperature of crystalline resin, and Tm is the melting temperature of crystalline resin Crystallization temperature (Tc) is preferably measured by differential scanning calorimetry (DSC) of a crystalline resin sheet or uncrystallized (i.e., supercooled) crystalline resin. Differential scanning calorimetry may be carried out in accordance with JIS K7122. Melting temperature (Tm) may also be measured by differential scanning calorimetry in accordance with JIS K7122.

Heat treatment time may be adjusted such that desired crystallinity (3-20%) is achieved and that MOR-c is 1.5-5.1 (in the case of side-clamped stretching) or 1.2-7 (in the case of side-unclamped stretching). Longer heat treatment time results in higher crystallinity before stretching as well as in higher MOR-c after stretching. By contrast, shorter heat treatment time results in lower crystallinity before stretching as well as in smaller MOR-c after stretching.

Crystallized resin films exhibiting too high crystallinity before stretched are so hard that they receive more orienting stress upon stretching; therefore, it is considered that not only relatively highly crystalline portions, but relatively less crystalline portions become highly oriented, resulting in higher MOR-c after stretching. On the other hand, if the crystallinity is too low, the crystallized resin films do not receive much orienting stress upon stretching due to the paucity of crystals to be oriented. Thus, it is considered that relatively highly crystalline portions also become less likely to be oriented and therefore MOR-c after stretching becomes low.

Heat treatment time varies depending on the heat treatment temperature, film thickness, molecular weight of the film's resin, and types or amounts of additives and copolymers. The practical heat treatment time is the sum of heat treatment time before pre-heating and pre-heating time immediately before stretching treatment. Heat treatment time for an amorphous resin sheet is generally 5 seconds to 20 minutes, preferably 10 seconds to 10 minutes. For example, when heating a crystallized resin sheet made of polyethylene terephthalate at 120° C., heat treatment time is preferably around 1.5-10 minutes, more preferably around 1.5-7 minutes.

In order to effectively impart both polarization selectivity and light diffusion property to a stretched crystallized resin film, it is important to previously adjust its crystallinity and transmission haze of the sheet before stretched. Specifically, one possible reason that crystallized resins show improved transparency by stretching is that stress converges on spherical crystals during stretching, whereby the spherical crystals are broken into sizes small enough to be insensitive to visible light. By stretching crystallized resins, it is possible to reduce their transparency under certain stretching conditions and thereby polarization and light diffusion property may be improved.

The crystallinity of the crystallized resin sheet immediately before stretching is preferably set such that the stretched sheet exhibits a crystallinity of 8-40%, more preferably 8-30%. Thus, in general, it is preferable that the crystallinity immediately before stretching be 3% or more, more preferably 3-30%, more preferably 3-20%.

The crystallinity of the crystallized resin film can be measured by the density method or X-ray diffractometry. The crystal particle size can be measured by polarization microscopy. Specifically, the crystallinity may be measured in the same manner as those for the measurement of the crystallinity of uniaxially stretched films.

The transmission haze of the crystallized resin sheet as measured immediately before stretching is preferably 7-70%, more preferably 15-60%, so that post-stretching transmission haze has an appropriate value for achieving practical polarization selectivity. In the case of off-line heat treatment, the transmission haze further increases in the pre-heating step immediately before stretching. Thus, in this case, it is necessary to set lower transmission haze in view of pre-heating conditions.

The transmission haze of the crystallized resin sheet may be measured in the same manner as that for the above-described polarizing diffuser film. It should be noted however that there is no need to calculate an average of transmission haze values of two different film directions, because crystallized resin sheets before stretching exhibits no optical anisotropy.

The thickness of the crystallized resin sheet before stretching mainly depends on the thickness of a polarizing diffuser film to be obtained by the stretching in the step (2) and on the stretch ratio; it is preferably 50-2,000 μm, more preferably 80-1,500 μm.

The means of uniaxially stretching the crystallized resin sheet is not specifically limited. As used herein, "uniaxial stretching" means stretching in a single axis direction. However, the sheet may also be stretched in different directions than the intended single axis direction so long as the effects of the present invention are not impaired. Certain types of stretchers stretch the sheet in a single axis direction as well as in substantially different directions than the single axis direction, even when stretching only in the single axis direction is intended. Thus "unixial stretching" encompasses stretching which also involves stretching in such unintended directions.

For example, the sheet may be stretched in directions perpendicular to the intended stretching direction. In general, "uniaxial stretching" in its pure sense means a stretching method which includes clamping opposing sides of the raw sheet and stretching it while the other opposing sides (stretch sides) are left unclamped (this scheme is also referred to as "transverse sides-unclamped uniaxial stretching"). In this method, the width between the opposing stretch sides narrows during stretching due to Poisson contraction. In other words, the sheet is not stretched in directions perpendicular to the stretching direction.

When using a batch stretcher, a raw sheet is clamped at each side. Thus, when the raw sheet is stretched in one direction, the sheet is unable to shrink in directions perpendicular to the stretching direction because the opposing stretch sides are clamped (this scheme is also referred to as "transverse sides-clamped uniaxial stretching"). This means that the sheet is substantially slightly stretched in the directions perpendicular to the stretching direction.

The term "uniaxial stretching" above encompasses "transverse sides-unclamped uniaxial stretching" and "transverse sides-clamped uniaxial stretching." Examples of methods of transverse sides-clamped uniaxial stretching includes roll stretching. Transverse sides-clamped uniaxial stretching encompasses transverse direction stretching by the tenter method, in addition to the method described above.

The sheet made of crystalline resin may be pre-heated immediately before uniaxial stretching. Pre-heating temperature can be generally set at any desired temperature from glass transition temperature Tg to melting temperature Tm. However, pre-heating temperature T preferably satisfies the relationship Tc−30° C.≦T<Tm−10° C. so that transmission haze and crystallinity before stretching respectively fall within the above ranges, i.e., so that crystallinity falls within a range of 8-30%. For example, in the case of resin sheets made of polyethylene terephthalate, pre-heating temperature is set at 100-240° C.

Pre-heating time is only required to be long enough to heat the crystallized resin sheet, prepared in step (1), to a predetermined temperature. On the other hand, too long pre-heating time excessively increases its crystallinity (e.g., over 30%) and thus renders stretching of the resin sheet difficult. For this reason, pre-heating time is appropriately adjusted such that desired crystallinity can be obtained. For example, in the case of resin sheets made of polyethylene terephthalate, pre-heating time is preferably set at 0.1-10 minutes.

Uniaxial stretching rate is not specifically limited, but is preferably set at 5-500%/sec, more preferably 9-500%/sec, further preferably 9-300%/sec, most preferably 20-300%/sec. Stretching rate is found using the equation below. In the equation, Lo is the raw sheet length, and L is the stretched sheet length after time t. If the stretching rate is too high, the orienting stress increases to an extent that imposes large loads on the equipment, which may prevent uniform stretching in some cases. On the other hand, if the stretching rate is too low, the productivity may be reduced due to extremely low production rates.

$$\text{Stretching rate}(\%/\text{sec}) = (L-L_o)/L_o/t \times 100$$

Stretching rate may be adjusted so that MOR-c after stretching is 1.5-5.1 (in the case of side-clamped stretching) or 1.2-7 (in the case of side-unclamped stretching). The higher the stretching rate, the more stress being placed on the crystallized sheet during stretching; thus, MOR-c after stretching becomes high. Correspondingly, the stress acting on the crystallized sheet during stretching decreases with decreasing stretching rate; thus, MOR-c after stretching becomes low. Note that an optimal stretching rate can vary depending on the crystallinity before stretching. The higher the crystallinity, the harder the sheet becomes and the greater the stretching stress. For this reason, an optimal stretching rate tends to be relatively low.

For example, when a crystallized resin sheet made of polyethylene terephthalate is stretched at around 120° C., the stretching rate is preferably set at 5-220%/sec. Note that the stretching rate is not required to be constant from the initial stage to final stage in stretching process; for example, the initial stretching rate may be set at 25%/sec, with an average stretching rate being 10%/sec.

Stretching temperature may be adjusted so that MOR-c after stretching is 1.5-5.1 (in the case of side-clamped stretching) or 1.2-7 (in the case of side-unclamped stretching). If the stretching temperature is high, lesser stress is placed on the crystallized sheet during stretching and thereby many relatively less crystalline portions, not relatively highly crystalline portions, are elongated without being highly orientated. Thus, MOR-c after stretching becomes low. On the other hand, if the stretching temperature is low, greater stress is placed on the crystallized resin sheet during stretching, which causes orientation of relatively highly crystalline portions as well as relatively less crystalline portions. Thus, MOR-c after stretching becomes high. For example, when stretching a crystallized resin sheet made of polyethylene terephthalate, the stretching temperature is preferably set at 105-135° C.

Stretching temperature may be equal or unequal to pre-heating temperature. When a double-chamber batch stretcher is used, a pre-heating chamber and stretching chamber can be set at different temperatures, and therefore, stretching temperature and pre-heating temperature may be set at different levels. On the other hand, when a single-chamber batch stretcher is used, stretching temperature equals to pre-heating temperature because one chamber serves both as a pre-heating chamber and a stretching chamber.

Stretch ratio is not specifically limited and is appropriately selected depending on the kind of resin to be employed. In the case of polyester resins, the resin sheet is preferably stretched 2-10 times its length (stretch ratio of 2-10). When the stretch ratio is too high, chances of tearing during stretching may increase. On the other hand, when the stretching ratio is too small, it may result in failure to obtain sufficiently orientated molecular structure.

The thickness of a polarizing diffuser film according to the present invention is 20-500 μm, more preferably 30-300 μm. If the film thickness is too small, the film fails to offer sufficient rigidity and therefore becomes hard to keep flatness. This may impair film handleability during manufacture of a liquid crystal display device or even may make difficult its installation to the liquid crystal device being manufactured. On the other hand, if the film thickness is too large, the film may be difficult to be wound in a roll for storage, or the yield may decrease due to increased required resin amount.

When a crystalline resin raw sheet or a crystallized resin sheet is uniaxially stretched under the conventional film manufacturing conditions, it is often the case that most of the microcrystals (generally spherical crystals formed of lamellar crystals) in the crystalline resin raw sheet and most of the spherical crystals in the crystallized resin sheet are disintegrated, with the result that their molecular chains are uniformly stretched. Thus, the resultant stretched resin film has a molecular structure in which molecules are substantially uniformly oriented and thus exhibit high transparency. By contrast, a uniaxially stretched resin film according to the present invention is prepared by uniaxial stretching of a crystallized sheet under the above special condition and thus has a bright-dark structure described above. In this way a stretched resin film with desired optical characteristics can be obtained.

3. Practical Applications of Polarizing Diffuser Film

Preferably, a polarizing diffuser film according to the present invention is used as a component of a liquid crystal display device. The polarizing diffuser film preferably has a surface shape having a light condensation function on either or both sides of the film so that the liquid crystal display device provided with the film exhibits high luminance, especially high normal-direction luminance. In general, such a light condensable surface shape is preferably provided only on one side of the polarizing diffuser film. For example, when the polarizing diffuser film is used in a liquid crystal display device, such a light condensable surface shape is preferably provided on the side of the film which contacts a polarizing plate.

By employing a light condensable surface shape as the surface shape of the polarizing diffuser film, it is possible to cause incident light beams with specific linear polarizations—which selectively pass through the film by polarization selectivity and travel in various directions by light diffusion property—to emit in the normal direction to the display screen, whereby normal-direction luminance can be enhanced. In this way the polarizing diffuser film having both light condensation function and selected polarized light reflection characteristics can enhance normal-direction luminance at lower costs than the combined use of a conventional prism film or microlens film and the polarizing diffuser film.

General films which have been conventionally used as prism films or microlens films are surface-modified biaxially stretched polyethylene terephthalate (PET) films. Even when any of these PET films is combined with a polarizing diffuser film, due to the large retardation in phase of the biaxially stretched PET film, it causes disturbance of the selected polarized light when it passes through the PET film. This reduces effects of reflections of selected polarized light beams. The polarizing diffuser film according to the present invention can realize cost reductions as well as thin liquid crystal display devices compared to the combined use of the prism film or microlens film and polarizing diffuser film.

Examples of light condensable surface shapes include, but not limited to, one-dimensional prism shape (see FIG. 8), two-dimensional prism shape (see FIG. 9), microlens shape (see FIGS. 10A and 10B), and wave shape.

Figure 8:
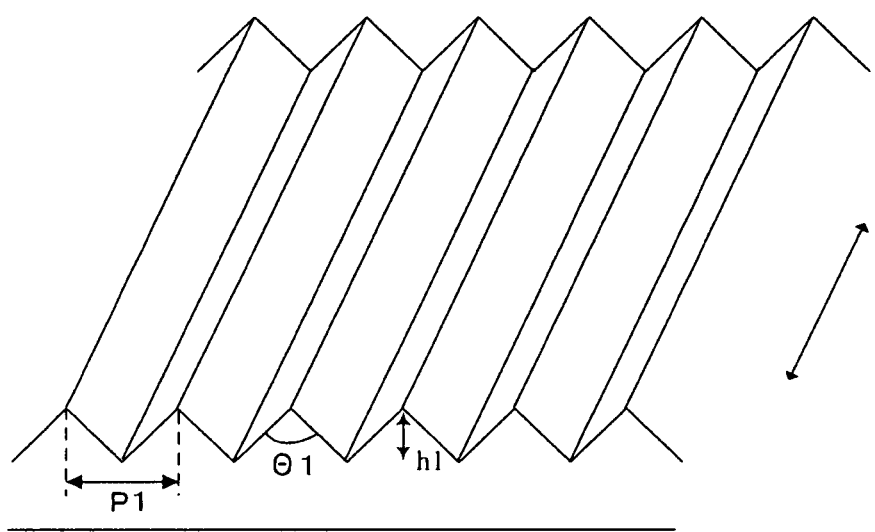
FIG. 8 is a perspective view showing a first example of the surface shape of a polarizing diffuser film according to an embodiment of the present invention, including the film's cross sectional view.

One-dimensional prism shape refers to a surface shape formed of multiple linear triangular prisms arranged side-by-side (see FIG. 8). FIG. 8 is a perspective illustration of a polarizing diffuser film having a surface of one-dimensional prism shape, including an illustration of a film section cut vertically to the ridge lines of the prisms. Prism pitch P1 is either regular pitch or variable pitch, and is preferably about 1-200 μm. Prism apex angle θ1 is preferably about 85-95°. Prism height h1 is preferably about 0.4-110 μm. The ridge lines of the prisms preferably run either in parallel or perpendicularly to the stretching direction of a uniaxially stretched resin film from which the polarizing diffuser film is made. This is for increasing the sheet feed rate during the manufacturing of the polarizing diffuser film.

Figure 9:
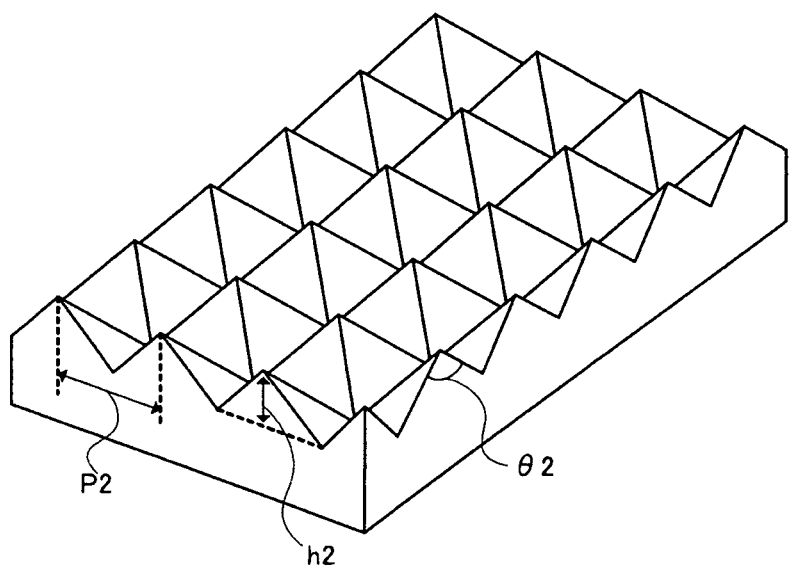
FIG. 9 is a perspective view showing a second example of the surface shape of a polarizing diffuser film according to an embodiment of the present invention, including the film's cross sectional view.

Two-dimensional prism shape refers to a surface shape formed of multiple quadrangular pyramids arranged in a matrix (see FIG. 9). FIG. 9 is a perspective illustration of a polarizing diffuser film having a surface of two-dimensional prism shape, including its sections. Distances P2 between the apexes of quadrangular pyramids may be regular or irregular, and are preferably about 1-200 μm each. Height h2 of the quadrangular pyramid as measured from the bottom is preferably about 0.4-110 μm. Prism apex angle θ2 may be about 85-95°

Figure 10A:
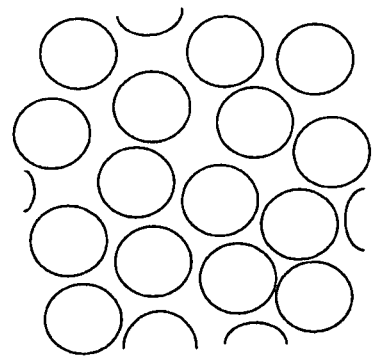
FIGS. 10A and 10B are a top view and a cross-sectional view respectively, each showing a third example of the surface shape of a polarizing diffuser film according to an embodiment of the present invention.
Figure 10B:
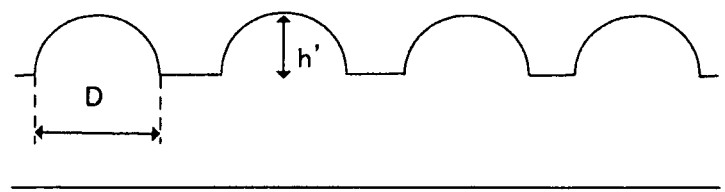

Microlens shape refers to a surface shape formed of multiple convex lens arranged over the film surface (see FIGS. 10A and 10B). The convex lens may be arranged either regularly or randomly. The term "regularly arranged" means for example a closed-packed arrangement. The lens shape is not specifically limited to spherical shape or non-spherical shape; the lens shape and lens size are appropriately selected depending on the desired levels of light condensation property and light diffusion property. FIG. 10A is a top view of a polarizing diffuser film having a surface of microlens shape, and FIG. 10B is a cross-sectional illustration of the film. Each microlens preferably has a diameter D of about 4-200 μm and height h' of about 2-100 μm.

A polarizing diffuser film according to the present invention, which has a light condensable surface shape, is preferably 20-650 μm in thickness, including the thickness of the light condensable surface.

As described above, a polarizing diffuser film according to the present invention may include a light condensable surface shape. The surface shape may be a surface shape of the uniaxially stretched resin film itself or a surface shape of a separate layer formed on the uniaxially stretched resin film. In the latter case, the separate layer preferably directly contacts the uniaxially stretched resin film. Specifically, the separate layer is directly formed on the uniaxialy stretched resin film without interposing additional layers (e.g., adhesion layer) between them.

The method of forming the light condensable surface shape is not specifically limited; any common method can be employed. For example, changing the surface shape of a uniaxially stretched resin film to a light condensable surface shape may be achieved by heat-pressing a mold with a specific pattern onto the surface of the resin film at a temperature from resin's glass transition temperature Tg to crystallization temperature Tc; cooling the mold for resin solidification; and separating the mold from the resin film. Heat-pressing may be accomplished by roll-press using forming rolls, double belt press, etc., in addition to plate/lamination press.

Moreover, changing the surface shape of a layer separately arranged on the surface of a uniaxially stretched film to a light condensable surface shape may be achieved by bringing a mold, in which active energy ray-curable resin is injected in its cavity, into intimate contact with the surface of the uniaxially stretched resin film; irradiating an active energy ray for resin curing; and separating the mold from the resin film. Examples of active energy ray-curable resins include UV curable resins and electron beam curable resins.

A polarizing diffuser film according to the present invention may be subjected to known adhesion improving treatment and/or smoothing treatment. Furthermore, the polarizing diffuser film may be subjected to known antireflection treatment, anti-Newton ring treatment, antistatic treatment, and/or hard coat treatment.

4. Liquid Crystal Display Device

A polarizing diffuser film according to the present invention is preferably used as one component of a liquid crystal display device. More specifically, a liquid crystal display device according to the present invention includes, in order, (A) a surface light source for a liquid crystal display backlight unit, (B) at least one optical device and/or air gap, (C) a polarizing diffuser film according to the present invention, and (D) a liquid crystal panel formed of a liquid crystal cell sandwiched between two or more polarizing plates.

(A) Surface Light Source for a Liquid Crystal Display Backlight Unit

The surface light source for a liquid crystal display backlight unit may be a side light (edge light) type surface light source, which is known light source(s) positioned at the side of the light guide, or a direct surface light source, which is known light source(s) positioned directly under the diffusion. Examples of known light sources include cold cathode fluorescent lamps (CCFLs), hot cathode fluorescent lamps (HCFLs), external electrode fluorescent lamps (EEFLs), flat fluorescent lamps (FFLs), light emitting diodes (LEDs), and organic electroluminescent devices (OLEDs).

(B) Optical Device and/or Air Gap

An optical device refers to a device by which light coming from the surface light source of the backlight unit is diffused. Examples of optical devices include light diffuser films coated with a binder which contains fillers or beads, prism sheets, and microlens sheets.

An air gap refers to an air layer formed between the surface light source of the backlight unit and the polarizing diffuser film according to the present invention. The air layer serves as light reflection interfaces between the air layer and the surface light source and between the air layer and polarizing diffuser film, and can diffuse light emitted from the surface light source. Examples of air gaps include air layers formed at concaves of a prism sheet.

(D) Liquid Crystal Panel Formed of Liquid Crystal Cell Sandwiched Between Two or More Polarizing Plates A liquid cell refers to a device which contains liquid crystals sealed between a pair of substrates. The substrates may be made of any known material; examples include glass substrates and plastic films. Similarly, the polarizing plates may be made of any known material; examples include dichroic polarizers containing dichroic dye. The lower polarizing plate is arranged on the surface of the liquid crystal cell at the surface light source A side, and the upper polarizing plate is arranged on the surface of the liquid crystal cell at the display screen side. The lower and upper polarizing plates are arranged so that their absorption axes are mutually perpendicular.

In large-size (e.g., 20 inch or larger) liquid crystal display devices, an upper polarizing plate is often placed with their absorption axes being oriented in the horizontal direction of the display screen. On the other hand, in medium-size or small-size (e.g., less than 20 inch) liquid crystal display devices, polarizing plates are often placed with their absorption axes being oriented at 45° to the vertical and horizontal directions of the display screen.

Figure 11:
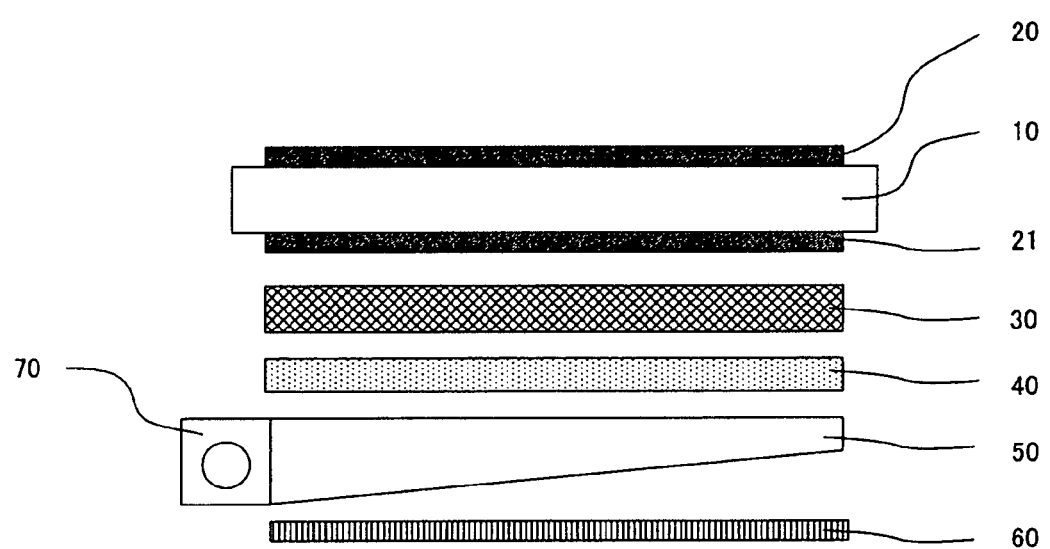
FIG. 11 shows an example of a configuration of a liquid crystal display device.

The above components A, B, C and D are preferably arranged in this order. FIG. 11 is an exploded illustration showing an example of a liquid crystal display device according to the present invention. In FIG. 11, side light type surface light source A for liquid crystal display backlight unit consists of light guide 50, reflection sheet 60, and light source 70. FIG. 11 shows polarizing diffuser film 30 (component C) and optical device 40 (component B) such as a beads-coated diffuser film. In some embodiments, a plurality of optical devices 40 may be provided, or not at all. Liquid crystal panel D consists of liquid crystal cell 10, upper polarizing plate 20, and lower polarizing plate 21.

Figure 12:
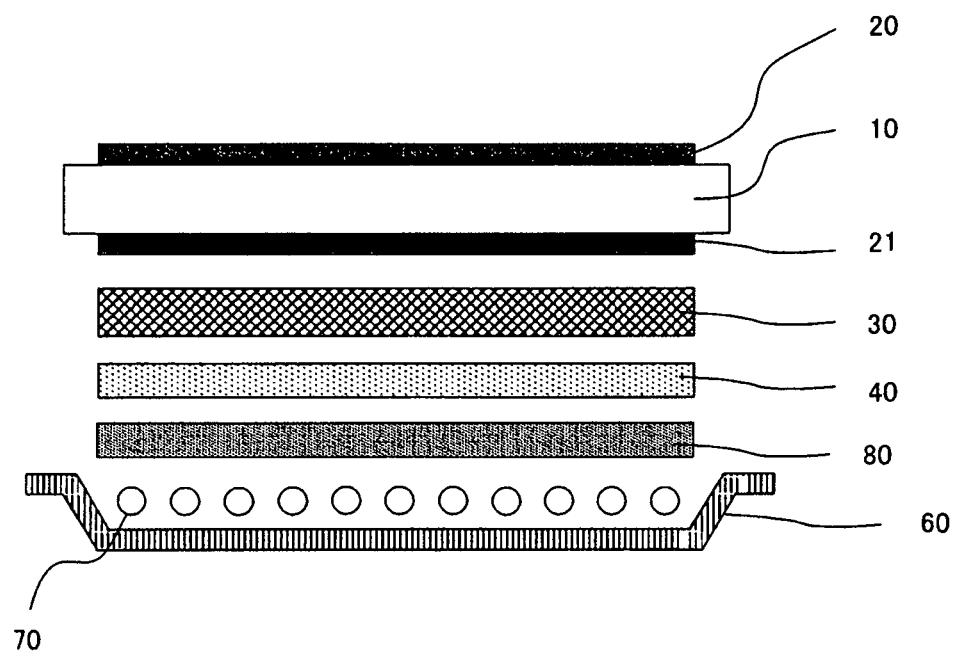
FIG. 12 shows another example of a configuration of a liquid crystal display device.

FIG. 12 is an exploded view of another example of a liquid crystal display device according to the present invention, which is identical to the liquid crystal display device shown in FIG. 11 except that it includes direct type surface light source A in place of the side light type surface light source, and a diffuser plate. Direct type surface light source A consists of an array of light sources 70 and reflection sheet 60. Diffuser plate 80 is arranged between direct type surface light source A and optical device 40 such as a light diffuser film, prism sheet or microlens sheet. In some embodiments, a plurality of optical devices 40 may be provided, or not at all.

Figure 13:
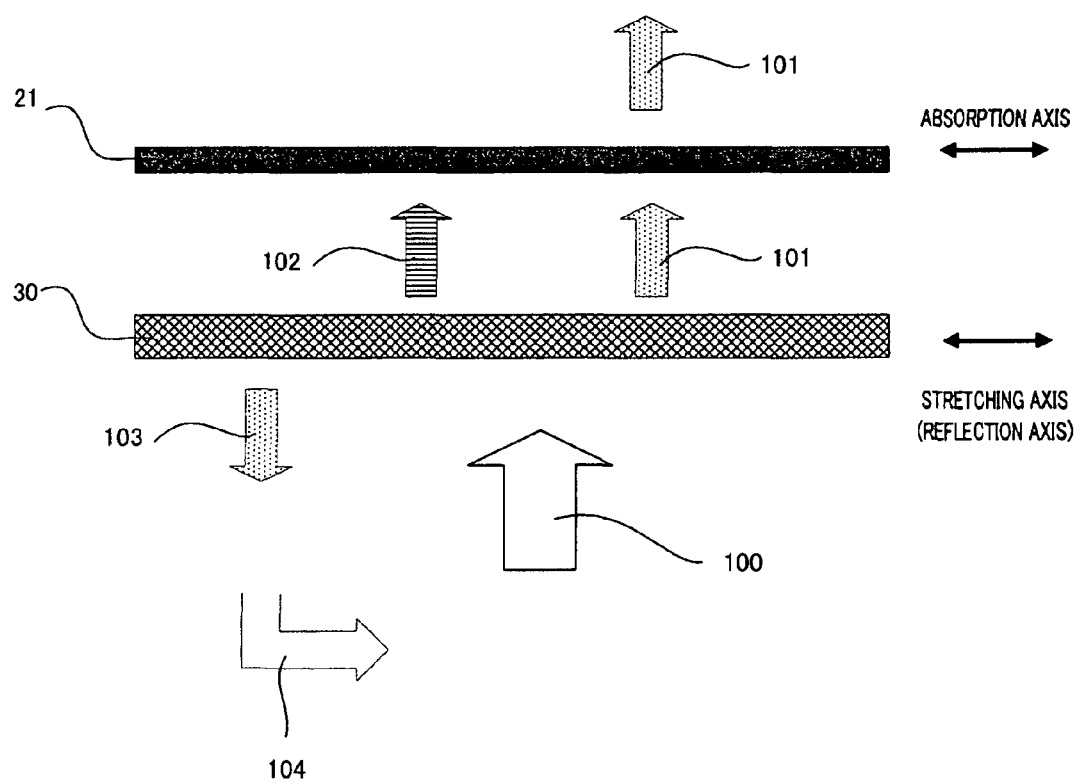
FIG. 13 is a schematic diagram for explaining the display mechanism of a liquid crystal display device.

FIG. 13 is a schematic diagram for explaining the display mechanism of a liquid crystal display device according to the present invention. In FIG. 13, polarizing diffuser film 30 is shown to be placed with its stretching axis being horizontally oriented on the paper. Polarizing diffuser film 30 allows a light beam with linear polarization perpendicular to the stretching axis to pass through, but reflects a light beam with linear polarization parallel to the stretching axis. Lower polarizing plate 21 is shown to be placed with its absorption axis being horizontally oriented on the paper.

Non-polarized light 100 emitted from the light source includes polarized light beam P with linear polarization parallel to the stretching axis of polarizing diffuser film 30, and polarized light beam V with linear polarization perpendicular to the stretching axis of polarizing diffuser film 30. Many of the polarized light beams V of non-polarized light 100 pass through polarizing diffuser film 30 and emit as polarized light beams V101. Polarized light beams V101 then pass through lower polarizing plate 21 without being absorbed, and emit as display light beams. Many of the polarized light beams V101 diffuse in different directions while maintaining their polarization states, and emit as display light beams over a wide range of viewing angles.

Some of the polarized light beams P in non-polarized light 100 diffuse through polarizing diffuser film 30 and emit as polarized light beams P102, which are then absorbed by lower polarizing plate 21. Many of the other polarized light beams P in non-polarized light 100 are reflected back, and many of them become polarized light beams P103.

Polarized light beams 103 are further reflected by an optical device or reflective sheet (not shown) and at the same time are depolarized, becoming reflected light beams 104. Reflected light beams 104 are reused as non-polarized light 100. With this configuration described above, the liquid crystal display device according to the present invention enables recycle of light and thus can provide high luminance as well as a wider viewing angle.

In the device shown in FIG. 13, polarizing diffuser film 30 is preferably placed such that its reflection axis (or stretching axis in the case where the film was prepared by uniaxial stretching) is substantially in parallel to the absorption axis of the lower polarizing plate 21. This is for increasing the display light amount and light use efficiency.

In a liquid crystal display device according to the present invention, polarizing diffuser film C is preferably arranged adjacent to liquid crystal panel D. This arrangement may obviate the need to provide "upper diffuser film" or other components, which are provided between components B and D in conventional liquid crystal display devices. Specifically, since the liquid crystal display device according to the present invention includes polarizing diffuser film C having excellent polarization selectivity and light diffusion property, it exhibits less luminance unevenness and high luminance regardless of the absence of a upper diffuser film or the like.

It is, of course, possible to provide additional film(s) between polarizing diffuser film C and liquid crystal panel D. In that case, it is preferable to provide film(s) which hardly disturb, reflect, or absorb polarized light beams V passing through the polarizing diffuser film C.

As described above, when polarizing diffuser film C includes one-dimensional prism shape on its surface, the ridge lines of the prisms preferably run in parallel or perpendicularly to the stretching direction of the uniaxially stretched resin film. In general, the absorption axis of the lower polarizing plate, which is oriented along the stretching direction of the uniaxially stretched resin film, is preferably oriented in the vertical direction of the display in the case of a large-size (e.g., 20 inch or larger) liquid crystal display device (e.g., LCD TV).

Thus, when the one-dimensional prisms are arranged so that their ridge lines are in parallel to the stretching direction of the uniaxially stretched resin film, it is often the case that the ridge lines are in parallel to the vertical direction of the display screen. When the ridge lines of the one-dimensional prisms are in parallel to the stretching direction of the stretched resin film, improved polarization selectivity is expected.

On the other hand, when the one-dimensional prisms are arranged so that their ridge lines are perpendicular to the stretching direction of the uniaxially stretched resin film, it is often the case that the ridge lines are in parallel to the horizontal direction of the display. In this case, luminance reductions at horizontally oblique viewing angles are suppressed.

When the polarizing plates are oriented at 45° to the vertical and horizontal directions of the display screen, the polarizing diffuser film according to present invention preferably has microlens shape rather than one-dimensional prism shape.

General polarizing plates include a surface protective film attached. In a liquid crystal display device according to the present invention, however, polarizing diffuser film C may serve as a surface protective film for the polarizing plate placed at the light source side (lower polarizing plate). Specifically, polarizing diffuser film C according to the present invention may be integrated with a polarizing plate to form a "polarizing plate with polarization selectivity and light diffusion property."

In general, polarizers for polarizing plates are manufactured by uniaxial stretching, with their absorption axis oriented in the stretching direction. Thus, a "polarizing plate with polarization selectivity and light diffusion property" can be readily manufactured by bonding together a polarizing diffuser film, which has been manufactured by longitudinal uniaxial roll stretching, and a polarizing plate by roll-to-roll process.

Polarizing diffuser film C according to the present invention thus can eliminate the need to provide components of conventional liquid crystal display devices. Liquid crystal display devices with a reduced number of components have the advantage of being cost effective and thin.

Conventional liquid crystal display devices include the following components between components A and D in order to achieve any or all of luminance increase, luminance unevenness reduction and wider view angle:

One or more diffuser films;
One or more diffuser films and one or more prism sheets; or
One or more diffuser films, one or more prism sheets, and one upper diffuser film.

In some cases, conventional liquid crystal display devices include, in place of diffuser films, microlens films or polarized light reflective films (e.g., "DBEF" from Sumitomo 3M Limited) adjacent to component D.

A liquid crystal display device according to the present invention includes a film with excellent polarization selectivity and light diffusion property and thus offers high luminance, less luminance unevenness and wider view angle as well as high cost effectiveness, regardless the absence of prism sheets, upper diffuser films and DBEF.

EXAMPLES

1. Relationship Between Optical Characteristics of Films and Luminance Characteristics Example 1

"A-PET sheet FR" (Teijin Chemicals Ltd., non-surface treated sheet; thickness: 330 μm) was cut into a 70 mm square piece to prepare a raw resin sheet ready for uniaxial stretching. The raw resin sheet was attached to a polymer film biaxial stretcher (Iwamoto BIX-703) by clamping it at each side, while the stretching direction is set to MD direction of the sheet.

The sheet was pre-heated at pre-heating temperature of 116° C. for pre-heating time of 8.5 minutes and was uniaxially stretched 5 times its length at a stretching rate of 24 mm/sec. So-called "transverse sides-clamped stretching" was employed in which the sheet is stretched while the stretch sides are clamped. The resultant polarizing diffuser film was 66 μm in thickness. By taking a long pre-heating time (8.5 minutes), the raw sheet immediately before stretching became clouded.

Example 2

A-PET sheet used in Example 1 as raw material was cut into a 80 mm square piece. To avoid shrinkage due to heating, the cut out sheet was clamped at each side by a clamp jig (clamp margin: 5 mm from the perimeter of the sheet). The clamped sheet was loaded in a gear oven ("Soyokaze SSR-113S" from Isuzu Seisakusho Co., Ltd.) and heated at 120° C. for 5 minutes to prepare a raw sheet ready for stretching. After the heat treatment, the sheet became hazy and had a transmission haze of 21% as measured by turbidimeter NDZ2000 from Nippon Denshoku Industries Co., Ltd.

The clamp margin was cut out from the heated sheet to prepare a 70 mm square raw sheet, which was uniaxially stretched in the same manner as in Example 1. Pre-heating temperature was set at 119° C., pre-heating time was set at 2 minutes, stretching rate was set at 48 mm/sec, and stretch ratio was set at 5. The resultant polarizing diffuser film was 82 μm in thickness.

Example 3

A-PET sheet used in Example 1 as raw material was cut into a 80 mm square piece. To avoid shrinkage due to heating, the cut out sheet was clamped at each side by a clamp jig (clamp margin: 5 mm from the perimeter of the sheet). The clamped sheet was loaded in a gear oven ("Soyokaze SSR-113S" from Isuzu Seisakusho Co., Ltd.) as in Example 2 and heated at 118° C. for 5 minutes to prepare a raw sheet ready for stretching. After the heat treatment, the sheet became hazy and had a transmission haze of 27% as measured using the same instrument as that of Example 2.

The raw sheet was uniaxially stretched in the same manner as in Example 2. In this Example, pre-heating temperature was set at 117° C., pre-heating time was set at 2 minutes, stretching rate was set at 48 mm/sec, and stretch ratio was set at 5. Moreover, so-called "transverse sides-unclamped stretching" was employed in which the sheet is stretched while the stretch sides are unclamped. The resultant polarizing diffuser film was 165 μm in thickness.

Example 4

A polarizing diffuser film of Example 4 (thickness: 137 μm) was manufactured in the same manner as that of Example 3 except that the heating time in the gear oven was set at 2 minutes and 25 seconds. The raw sheet after heating in the gear oven showed a transmission haze of 8%.

Example 5

Polyethylene naphthalate (PEN) resin (Teonex TN8065S, Teijin Chemicals Ltd.) was loaded in a 40 mm-diameter single screw extruder (length-to-diameter ratio (L/D)=32) equipped with a full flight screw, and extruded through a T die for deposition onto a cooling roll. Extrusion temperature was set at 320° C. The resultant casting sheet was 300 μm in thickness. The sheet was cut into a 70 mm square piece to prepare a raw sheet ready for uniaxial stretching. The raw sheet was uniaxially stretched in the MD direction of the sheet in the same manner as in Example 1. In this Example, pre-heating temperature was set at 150° C., pre-heating time was set at 8.5 minutes, stretching rate was set at 24 mm/sec, and stretch ratio was set at 5. The resultant polarizing diffuser film was 60 μm in thickness. By taking a long pre-heating time (8.5 minutes), the raw sheet immediately before stretching became clouded.

Comparative Example 1

A 64 μm-thick stretched film was prepared in the same manner as in Example 1 except that pre-heating time in uniaxial stretching was set at 4 minutes. The raw sheet immediately before stretching showed almost no clouding.

Comparative Example 2

A 180 μm-thick stretched film was prepared in the same manner as in Example 1 except that stretch ratio was set at 2.

The resultant stretched resin films were measured for total light transmittance, transmission polarization degree, and transmission haze. Measurements were made using Spectrophotometer U-4100 (Hitachi High-Technologies Corporation) and a 150 mm-diameter integrating sphere attachment. The results are listed in Table 1.

TABLE 1

| | TOTAL LIGHT TRANSMITTANCE (%) | TRANSMISSION HAZE (%) | TRANSMISSION POLARIZATION DEGREE (%) |
|---|---|---|---|
| EXAMPLE 1 | 80.5 | 27.7 | 30.4 |
| EXAMPLE 2 | 70.8 | 58.7 | 40.9 |
| EXAMPLE 3 | 59.7 | 71.3 | 45.2 |
| EXAMPLE 4 | 62.8 | 49.4 | 49.5 |
| EXAMPLE 5 | 81.6 | 25.1 | 41.6 |
| COMPARATIVE EXAMPLE 1 | 88.1 | 6.4 | 13.0 |
| COMPARATIVE EXAMPLE 2 | 80.1 | 34.9 | 16.7 |

It was demonstrated that while the polarizing diffuser films of Examples 1-5 exhibit high transmission polarization degree (>30%), the stretched films prepared in Comparative Examples 1 and 2 were less than 20% in transmission polarization degree.

Liquid crystal display devices were manufactured using the polarizing diffuser films prepared in Examples 1-5 and Comparative Examples 1 and 2.

Example 6

10.4-inch VA-mode TFT liquid crystal displays (Kyocera Corporation) were prepared. In the respective displays, the configuration over the light guide of the backlight unit (a dual CCFL side light type backlight) was changed as follows:

1) A beads-coated diffuser film was placed on the optical light guide (the film has a total light transmittance of 58% and transmission haze of 91% for light incident on the opposite side of the film from the light diffusing surface);

2) The polarizing diffuser film of Example 1 was placed on the center of the beads-coated diffuser film so that the stretching axis (reflection axis) is substantially in parallel to the absorption axis of the lower polarizing plate of the liquid crystal panel; and 3) For light blocking, a black sheet was applied over an area of the beads-coated diffuser film not covered with the polarizing diffuser film.

Examples 7-10

Liquid crystal display devices of Examples 7-10 were manufactured in the same manner as in Example 6 except that the polarizing diffuser films of Examples 2-5 were respectively used in place of the polarizing diffuser film of Example 1.

Example 11

10.4-inch VA-mode TFT liquid crystal displays (Kyocera Corporation) were prepared and partially remodeled as follows:

1) A light source-side protection film was peeled off from the lower polarizing plate of the liquid crystal display panel;

2) The polarizing diffuser film of Example 2 was bonded to the center of the exposed lower polarizing plate with a 15 μm-thick acrylic transparent adhesion sheet. The polarizing diffuser film was placed with its stretching direction substantially in parallel to the absorption axis of the lower polarizing plate;

3) For light blocking, a black mask sheet was applied over an area of the lower polarizing plate not covered with the polarizing diffuser film; and 4) A beads-coated diffuser film was exclusively placed on the light guide of the backlight unit of the liquid crystal display (the film has a total light transmittance of 58% and transmission haze of 91% for light incident on the opposite side of the film from the light diffusing surface);

Comparative Examples 3-5

Liquid crystal display devices of Comparative Examples 3-5 were manufactured in the same manner as in Example 6 except that the stretched films of Comparative Examples 1 and 2 and a beads-coated diffuser film, which has a total light transmittance of 87% and transmission haze of 48% for light incident on the opposite side of the film from the light diffusing surface, were respectively used in place of the polarizing diffuser film of Example 1.

The liquid crystal display devices thus manufactured were measured for relative normal-direction luminance and relative luminance at oblique viewing angles. Specifically, a luminance of the screen center of the liquid crystal display device placed on the X-Y-θ stage was measured at 1° field angle with TOPCON BM-7 luminance meter, under which the polarizing diffuser film is arranged. The normal-direction luminance was measured in a state where the measurement axis of the luminance meter is aligned with the normal of the display screen surface. Oblique luminance was measured in a state where the measurement axis is titled at 40° or 60° from the normal of the display screen surface, i.e., "40° luminance" and "60° luminance" were measured.

A reference liquid crystal display device was manufactured which is identical to the liquid crystal display device of Example 6 except for the absence of a polarizing diffuser film. Specifically, the reference liquid crystal display was manufactured by placing a light blocking black mask sheet, which is identical in opening position and opening size to those used in Examples, onto a beads-coated diffuser film. The reference liquid crystal display device was measured for normal-direction luminance, 40° luminance and 60° luminance in the same manner as described above. Relative luminance values were then calculated for the liquid crystal display devices of Examples and Comparative Examples with respect to the reference luminance values (=100) measured for the reference liquid crystal display device. The obtained relative luminance values are listed in Table 2.

TABLE 2

|  | FILM SAMPLE | RELATIVE LUMINANCE (RELATIVE VALUES TO REFERENCE (=100)) | | |
|---|---|---|---|---|
|  |  | VERTICAL | 40° | 60° |
| EXAMPLE 6 | EXAMPLE 1 | 105.6 | 105.8 | 107.4 |
| EXAMPLE 7 | EXAMPLE 2 | 110.5 | 103.7 | 108.1 |
| EXAMPLE 8 | EXAMPLE 3 | 110.0 | 99.6 | 110.2 |
| EXAMPLE 9 | EXAMPLE 4 | 115.2 | 111.6 | 123.1 |
| EXAMPLE 10 | EXAMPLE 5 | 112.1 | 106.9 | 109.2 |
| EXAMPLE 11 | EXAMPLE 2 | 110.7 | 104.2 | 108.7 |
| COMPARATIVE EXAMPLE 3 | COMPARATIVE EXAMPLE 1 | 101.8 | 104.2 | 109.8 |
| COMPARATIVE EXAMPLE 4 | COMPARATIVE EXAMPLE 2 | 102.1 | 100.3 | 104.3 |
| COMPARATIVE EXAMPLE 5 | BEADS-COATED OPTICAL DIFFUSER FILM | 110.4 | 96.7 | 79.4 |

The relative normal-direction luminance of the liquid crystal display device of Example 6 was only less than 5% smaller than that of the liquid crystal display device of Comparative Example 5 having a beads-coated diffuser film. Moreover, the liquid crystal display device of Example 6 exhibited large relative oblique luminance values compared to those of Comparative Example 5, providing a significantly widened viewing angle. The liquid crystal display devices of Comparative Examples 3 and 4 exhibited higher relative oblique luminance values, but not less than 5% smaller relative normal-direction luminance values than the liquid crystal display device of Comparative Example 5, thus exhibiting poor light diffusion property.

The liquid crystal display devices of Examples 7-11 exhibited high values for all of relative normal-direction luminance, 40° luminance and 60° luminance compared to the liquid crystal display device of Comparative Example 5. In particular, the liquid crystal display devices of Examples 7 and 9-11 exhibited high values for all of relative normal-direction luminance, 40° luminance and 60° luminance compared the reference liquid crystal display device, thus exhibiting improved luminance and wider viewing angle.

2, Relationship Between Film Manufacturing Conditions and Optical Characteristics The relationship between crystallinity and transmission haze of the crystallized sheet before stretching, and the optical characteristics of the stretched crystallized sheet was investigated.

Example 12

"A-PET sheet FR" (Teijin Chemicals Ltd., non-surface treated sheet; thickness: 330 μm) was cut into a 80 mm square piece. To avoid shrinkage due to heating, the cut out sheet was clamped at each side by a clamp jig (clamp margin: 5 mm from the perimeter of the sheet). The clamped sheet was loaded in a gear oven ("Soyokaze SSR-113S" from Isuzu Seisakusho Co., Ltd.) and heated at 120° C. for 4 minutes and 20 seconds to prepare a raw sheet. The sheet after heat treatment became hazy and had a transmission haze of 7.7% as measured by turbidimeter NDH2000 from Nippon Denshoku Industries Co., Ltd.

The clamp margin was cut out from the heated sheet to prepare a 70 mm square raw sheet, which was uniaxially stretched. The raw resin sheet was attached to a polymer film biaxial stretcher (Iwamoto BIX-703) by clamping it at each side. The sheet was pre-heated at pre-heating temperature of 116° C. for pre-heating time of 2 minutes and uniaxially stretched 5 times its length at a stretching rate of 24 mm/sec in the MD direction of the raw sheet. Transverse sides-clamped stretching was employed in which the sheet is stretched while the stretch sides are clamped. The resultant stretched resin film was 72 μm in thickness.

The resultant stretched resin film was measured for total light transmittance, transmission polarization degree, and transmission haze. Measurements were made using Spectrophotometer U-4100 (Hitachi High-Technologies Corporation) and a 150 mm-diameter integrating sphere attachment. The results are listed in Table 3.

Further, the stretched resin film was measured for crystallinity as follows. The film's density was measured by the density gradient tube method using a water bath for specific gravity measurement with density gradient method (OMD-6, Ikeda Scientific Co., Ltd.), calculating the crystallinity based on the found density. The results are listed in Table 3.

"A-PET sheet FR" (Teijin Chemicals Ltd.) was loaded in the gear oven and heated at 120° C. for 4 minutes and 20 seconds to prepare a raw sheet. The sheet was attached to the polymer film biaxial stretcher followed by pre-heating at 116° C. for 2 minutes. Specifically, the resin sheet was pre-heated in much the same way as described above, and then detached from the stretcher without being stretched. The non-stretched raw sheet (crystallized sheet) was measured for transmission haze and crystallinity in the same manner as described above.

Example 13

A stretched resin was prepared in the same manner as in Example 12 except that heating time in the gear oven was set at 4 minutes and 50 seconds. The raw sheet after heat treatment in the oven had a transmission haze of 19.4%. The obtained stretched resin film was 72 μm in thickness. The resultant stretched resin film was measured for total light transmittance, transmission polarization degree, transmission haze and crystallinity in the same manner as in Example 12. The results are listed in Table 3.

"A-PET sheet FR" (Teijin Chemicals Ltd.) was loaded in the gear oven and heated at 120° C. for 4 minutes and 50 seconds to prepare a raw sheet. The sheet was attached to the polymer film biaxial stretcher followed by pre-heating at 116° C. for 2 minutes. Specifically, the resin sheet was pre-heated in much the same way as described above, and then detached from the stretcher without being stretched. The non-stretched raw sheet (crystallized sheet) was measured for transmission haze and crystallinity in the same manner as in Example 12.

Example 14

Polyethylene terephthalate (PET) resin ("Mitsui PET J125" from Mitsui Chemicals, Inc.) was loaded in a 40 mm-diameter single screw extruder (length-to-diameter ratio (L/D)=32) equipped with a full flight screw, and extruded through a T die for deposition onto a cooling roll to prepare a casting sheet. Extrusion temperature was set at 270° C. The resultant casting sheet was 300 μm in thickness.

The casting sheet was cut into a 80 mm square piece to prepare a raw sheet. A heated raw sheet was then prepared in the same manner as in Example 12 except that heat treatment in the gear oven was carried out at 120° C. for 2 minutes and 50 seconds. The heated raw sheet had a transmission haze of 9.3%.

A stretched resin film was prepared in the same manner as in Example 12 by uniaxially stretching the raw sheet in the MD direction (stretching rate was set at 48 mm/sec). The resultant stretched resin film was 63 μm in thickness. The stretched resin film was measured for total light transmittance, transmission polarization degree, transmission haze and crystallinity in the same manner as in Example 12. The results are listed in Table 3.

The casting sheet heated in the gear oven at 120° C. for 2 minutes and 50 seconds to prepare a raw sheet. The sheet was attached to the polymer film biaxial stretcher followed by pre-heating at 116° C. for 2 minutes. Specifically, the resin sheet was pre-heated in much the same way as described above, and then detached from the stretcher without being stretched. The non-stretched raw sheet (crystallized sheet) was measured for transmission haze and crystallinity in the same manner as in Example 12.

Example 15

A stretched resin film was prepared in the same manner as in Example 12 except that heating time of the heat treatment in the gear oven was set at 4 minutes and 40 seconds and that "transverse sides-unclamped stretching" was employed in which the sheet is stretched while the stretch sides are unclamped. The raw sheet after heat treatment in the gear oven had a transmission haze of 8.9%. The resultant stretched resin film was 134 μm in thickness. The stretched resin film was measured for total light transmittance, transmission polarization degree, transmission haze and crystallinity in the same manner as in Example 12. The results are listed in Table 3.

"A-PET sheet FR" (Teijin Chemicals Ltd.) was loaded in the gear oven and heated at 120° C. for 4 minutes and 40 seconds to prepare a raw sheet. The sheet was attached to the polymer film biaxial stretcher followed by pre-heating at 116° C. for 2 minutes. Specifically, the resin sheet was pre-heated in much the same way as described above, and then detached from the stretcher without being stretched. The non-stretched raw sheet (crystallized sheet) was measured for transmission haze and crystallinity in the same manner as in Example 12.

Comparative Example 6

"A-PET sheet FR" (Teijin Chemicals Ltd., non-surface treated sheet; thickness: 330 μm) was cut into a 70 mm square piece to prepare a raw sheet ready for uniaxial stretching. The raw sheet was attached to the polymer film biaxial stretcher (Iwamoto BIX-703) by clamping each side of the raw sheet. The sheet was pre-heated at pre-heating temperature of 116° C. for pre-heating time of 2 minutes. The raw sheet before stretching did not become hazy when visually observed. The raw sheet was then uniaxially stretched 4.5 times its length at a stretching rate of 48 mm/sec in the MD direction of the sheet to prepare a stretched resin film. Transverse sides-clamped stretching was employed in which the sheet is stretched while the stretch sides are clamped. The resultant film was 70 μm in thickness.

Further, another 70 mm square piece was pre-heated in much the same way as described above by heating it at 124° C. for 2 minutes, and then detached from the stretcher without being stretched. The non-stretched raw sheet (crystallized sheet) was measured for transmission haze and crystallinity in the same manner as in Example 12. The results are listed in Table 3.

As shown in Table 3, by properly adjusting the transmission haze and crystallinity of a crystallized film before it is stretched, it is possible to provide the resultant stretched film with desired optical characteristics, i.e., to impart transmission polarization degree and transmission haze in a balanced manner.

3. Relationship Between Optical Characteristics and Microstructure

The relationship between MOR-c and optical characteristics of a stretched resin film, and the relationship between microstructure and optical characteristics of the stretched resin film were investigated.

Example 16

"A-PET sheet FR" (Teijin Chemicals Ltd., non-surface treated sheet; thickness: 330 μm; denoted as "Resin A" in Table 1) was cut into a 70 mm square piece to prepare a raw sheet ready for uniaxial stretching. The raw sheet was attached to the polymer film biaxial stretcher (Iwamoto BIX-703) by clamping each side of the raw sheet, with the stretching direction aligned with the MD direction of the raw sheet. The sheet was pre-heated at pre-heating temperature of 118° C. for pre-heating time of 8 minutes. The raw sheet immediately before stretching became hazy. The raw sheet was then uniaxially stretched 5 times its length at a stretching rate of 48 mm/sec to prepare a polarizing diffuser film. Transverse sides-clamped stretching was employed in which the sheet is stretched while the stretch sides are clamped. The resultant film was 75 μm in thickness.

Example 17

A-PET sheet used in Example 16 as raw material was cut into a 80 mm square piece. To avoid shrinkage due to heating, the cut out sheet was clamped at each side by a clamp jig (clamp margin: 5 mm from the perimeter of the sheet). The clamped sheet was loaded in a gear oven ("Soyokaze SSR-113S" from Isuzu Seisakusho Co., Ltd.) and heated at 120° C. for 2.8 minutes to prepare a raw sheet ready for stretching. After the heat treatment, the sheet became hazy and had a transmission haze of 22% as measured by turbidimeter NDH2000 from Nippon Denshoku Industries Co., Ltd.

The clamp margin was cut out from the heated sheet to prepare a 70 mm square raw sheet, which was uniaxially stretched in the same manner as in Example 16. Pre-heating temperature was set at 116° C., pre-heating time was set at 2 minutes. The resultant polarizing diffuser film was 76 μm in thickness.

Examples 18-26 and 29-30

Polarizing diffuser films of Examples 18-26 and 29-30 were prepared in the same manner as in Example 17 except that the heat treatment conditions (heating temperatures and heating times) in the gear oven before stretching, pre-heating temperatures, pre-heating times, and stretching conditions (stretching rates and stretching temperatures) shown in Table 4 were used.

Examples 27-28 and 31

Polarizing diffuser films of Examples 27-28 and 31 were prepared in the same manner as in Example 17 except that "transverse sides-unclamped stretching" was employed in which the sheet is stretched while the stretch sides are unclamped, and that the heat treatment conditions (heating temperatures and heating times) in the gear oven before stretching, pre-heating temperatures, pre-heating times, and stretching conditions (stretching rates and stretching temperatures) shown in Table 4 were used.

Examples 32-36

Polarizing diffuser films of Examples 32-36 were prepared in the same manner as in Example 17 except that the raw sheet prepared in Example 17 was placed by A-PET sheets ("PET26P" from Osaka Plastics Mfg. Co., Ltd.; non-surface treated sheet; thickness: 200 μm; denoted as "Resin B" in Table 5), and that the heat treatment conditions (heating temperatures and heating times) in the gear oven before stretching, pre-heating temperatures, pre-heating times, and stretching conditions (stretching rates and stretching temperatures) shown in Table 5 were used.

Examples 37 and 38

Polyethylene terephthalate (PET) resin ("Mitsui PET SA135" from Mitsui Chemicals, Inc.) was loaded in a 40 mm-diameter single screw extruder (length-to-diameter ratio (L/D)=32) equipped with a full flight screw, and extruded through a T die for deposition onto a cooling roll to prepare casting sheets as raw sheets (denoted as "Resin C" in Table 5). These sheets were used in place of the raw sheet prepared in Example 17. Extrusion temperature was set at 270° C. The resultant casting sheets were 300 μm in thickness.

Polarizing diffuser films of Examples 37 and 38 were then prepared in the same manner as in Example 17 except that the heat treatment conditions (heating temperatures and heating times) in the gear oven before stretching, pre-heating temperatures, pre-heating times, and stretching conditions (stretching rates and stretching temperatures) shown in Table 5 were used.

Examples 39 and 40

Polyethylene terephthalate (PET) resin ("Mitsui PET J125" from Mitsui Chemicals, Inc.) was loaded in a 40 mm-diameter single screw extruder (length-to-diameter ratio (L/D)=32) equipped with a full flight screw, and extruded through a T die for deposition onto a cooling roll to prepare casting sheets as raw sheets (denoted as "Resin D" in Table 5). These sheets were used in place of the raw sheet prepared in Example 17. Extrusion temperature was set at 270° C. The resultant casting sheets were 300 μm in thickness.

Polarizing diffuser films of Examples 39 and 40 were then prepared in the same manner as in Example 17 except that the heat treatment conditions (heating temperatures and heating times) in the gear oven before stretching, pre-heating temperatures, pre-heating times, and stretching conditions (stretching rates and stretching temperatures) shown in Table 5 were used.

Comparative Examples 7-13

Polarizing diffuser films of Comparative Examples 7-13 were then prepared in the same manner as in Example 16 or 17 except that the heat treatment conditions (heating temperatures and heating times) in the gear oven before stretching, pre-heating temperatures, pre-heating times, and stretching conditions (stretching rates and stretching temperatures) shown in Table 4 were used.

Comparative Examples 14 and 15

Polarizing diffuser films of Comparative Examples 14 and 15 were then prepared in the same manner as in Example 32 except that the heat treatment conditions (heating temperatures and heating times) in the gear oven before stretching, pre-heating temperatures, pre-heating times, and stretching conditions (stretching rates and stretching temperatures) shown in Table 5 were used.

Comparative Examples 16-19

Polarizing diffuser films of Comparative Examples 16-19 were then prepared in the same manner as in Example 37 or 39 except that the heat treatment conditions (heating temperatures and heating times) in the gear oven before stretching, pre-heating temperatures, pre-heating times, and stretching conditions (stretching rates and stretching temperatures) shown in Table 5 were used.

1) Measurement of Optical Characteristics

The stretched resin films prepared in Examples and Comparative Examples were measured for total light transmittance (Ttotal), total light transmittance at 100 μm film thickness (Ttotal@100 μm), transmission polarization degree, transmission polarization degree at 100 μm film thickness, transmission haze, and transmission haze at 100 μm film thickness. Measurements were made using Spectrophotometer U-4100 (Hitachi High-Technologies Corporation) and a 150 mm-diameter integrating sphere attachment as with the measurements above.

2) Measurement of Crystallinity

The stretched resin films were measured for crystallinity. Specifically, the film's density was measured by the density gradient tube method using a water bath for specific gravity measurement with density gradient method (OMD-6, Ikeda Scientific Co., Ltd.), calculating the crystallinity based on the found density.

3) Measurements of Molecular Orientation Ratio-Correction (MOR-c)

MOR-c values were measured with microwave molecular orientation analyzer MOA-6000 (Oji Scientific Instruments). Reference thickness tc was set at 100 μm. The results are listed in Tables 6 and 7.

It is learned from Tables 6 and 7 that while the stretched resin films of Examples 16-40 exhibited total light transmittance values ranging from 50-90% to visible light, transmitted haze values ranging from 15-90% to visible light and transmission polarization degree values ranging from 20-90% to visible light, the stretched resin films of Comparative Examples 7-13 failed to satisfy any one of these numeric ranges.

It is particularly learned from Tables 6 and 7 that in order to achieve transmission polarization degree of over 30%, it is preferable to adjust heat treatment time before stretching, stretching rate or stretching temperature such that MOR-c falls within a range of 1.5-5 (in the case of side-clamped stretching) or a range of 1.5-7 (in the case of side-unclamped stretching).

Specifically, referring to Tables 5 and 7, it is learned from the comparison between Examples 37 to 40 and Comparative Examples 16 to 19 that haze before pre-heating increases with increasing heat treatment time, and haze before pre-heating decreases with decreasing heat treatment time. Moreover, it is learned that MOR-c increases with increasing haze before pre-heating, and MOR-c decreases with decreasing haze before pre-heating. It should be noted that it is also learned that when haze before pre-heating is too high (>40%), MOR-c after stretching also becomes so high (5~6, in the case of side-clamped stretching) that transmission polarization degree becomes somewhat low (<30%).

By comparing Examples 18-19 and 29 in Tables 4 and 6 as well as Examples 32-33 and Comparative Example 14 in Tables 5 and 7, it is learned that MOR-c decreases with decreasing stretching rate, and MOR-c increases with increasing stretching rate. It should be noted that when the stretching rate is too high (200 mm/sec), the sheet undergoes excessive molecular orientation. Thus it is learned that high stretching rates results in too large MOR-c (4.8-5.3 in the case of side-clamped stretching) and therefore somewhat low transmission polarization degree (<30%). Similarly, by comparing Examples 27-28 and 31 in Tables 4 and 6, it is learned that the stretching rate as high as 173 mm/sec results in too high MOR-c (around 6-7 in the case of side-unclamped stretching) and therefore somewhat low transmission polarization degree (<30%).

By comparing Examples 24 and 25 and Comparative Examples 12 and 13 in Tables 4 and 6, it is learned that MOR-c decreases with increasing stretching temperature, and MOR-c increases with decreasing stretching temperature. It should be noted that when the stretching temperature is too low, the sheet is excessively oriented during stretching. Thus, it is learned that too low stretching temperatures result in too high MOR-c—exceeding 5.1 in the case of side-clamped stretching—and therefore lower transmission polarization degree (<30%).

4) Polarization Microscopy/Raman Spectrometry

For sections of the stretched resin films of Examples 17 and 35, which are cut along the stretching direction, a polarization microscopy image was taken and a Raman spectrum was measured. Measurement samples (thickness: 1 μm) prepared by cutting the stretched resin films in the stretching direction were used.

Polarization microscopy was carried under the following condition:
Instrument name: NIKON OPTIPHOT-2
Observation condition:
Objective lens: ×100
Imaging device: CANON PowerShot A650
Polarization microscopy condition:
Polarizing films are respectively arranged at light incident side and observation light side of the object.
Raman spectra were measured under the following condition:
Instrument name: Ramanor T-64000 (Jobin Yvon/Atago Bussan Co., Ltd.).
Measurement mode: micro-Raman spectrometry
Cross slit: 100-200 μm;
light source: Argon-ion laser (wavelength: 5145 angstrom)
Output: 5-30 mW The stretched resin films of Examples 17 and 35 were both confirmed to have bright-dark structure in which bright portions are elongated along the stretching direction (the polarization microscopy image of the stretched resin film of Example 35 is shown in FIG. 2A).

Figure 19A:
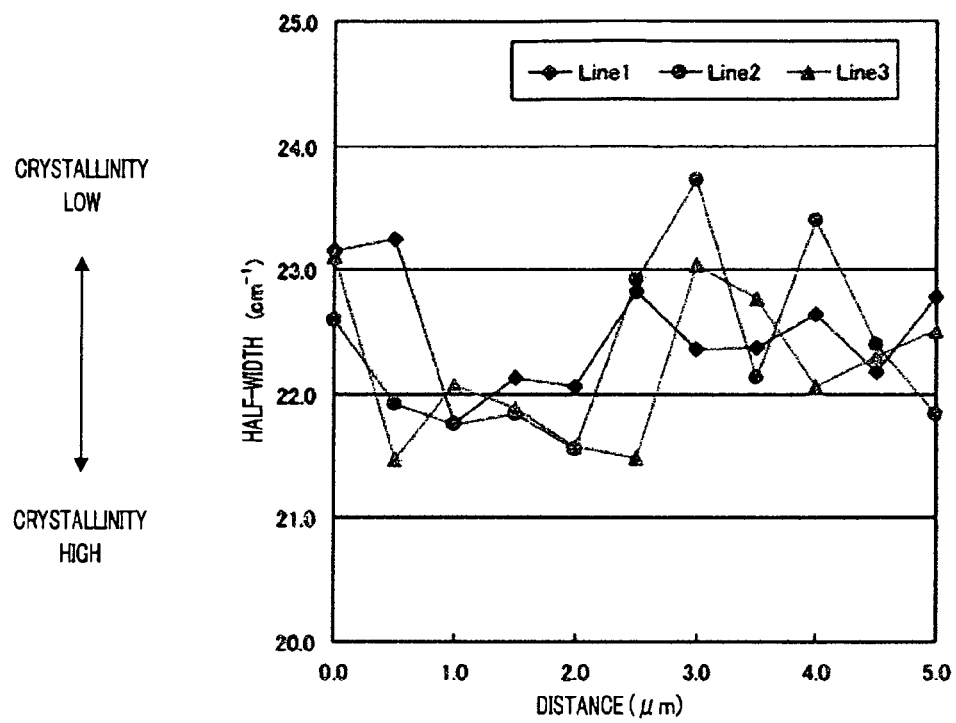
FIG. 19 shows a graph of crystallinity and degree of orientation for polarizing diffuser films of Examples at different measurement points.
Figure 19B:
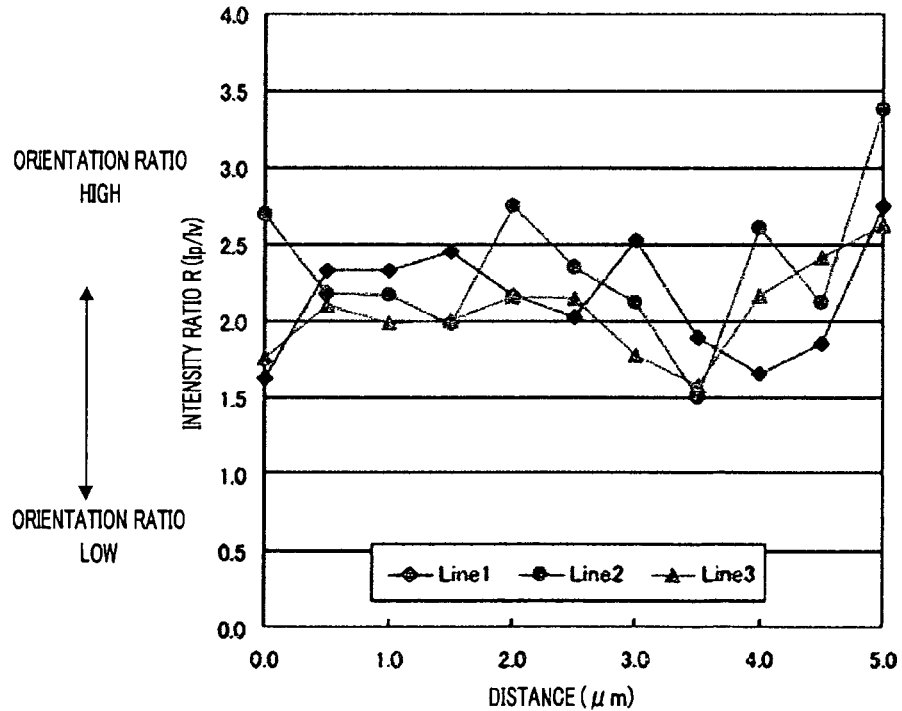

For the stretched resin film of Example 17, crystallinity and degree of orientation were measured at different measurement positions in the same manner as described above. The results are shown in FIGS. 19A and 19B. As with FIGS. 4 and 6, it was confirmed that, regarding the band near 1730 cm$^{-1}$ in the Raman spectrum, at least one of the half-value width differences between adjacent local maximum peak and local minimum peak is not less than 0.2 cm$^{-1}$, and that, regarding the band near 1615 cm$^{-1}$, at least one of the band intensity ratio (Ip/Iv) differences between adjacent local maximum peak and local minimum peak is not less than 0.03.

5) TEM Observation

For some of the obtained stretched resin films, the bright area ratio was measured in a TEM image of a section perpendicular to the stretching direction. TEM images were taken with the transmission electron microscope H-7650 (Hitachi High-Technologies Corporation). The results are listed in Tables 8 and 9 together with the results of the above measurements 1), 2) and 3).

It is confirmed that while the stretched resin films of Examples in Table 8 had bright-dark structure by TEM of their sections perpendicular to the stretching direction, most of the stretched resin films of Comparative Examples in Table 9 had no bright-dark structure.

4. Relationship Between Surface Shape and Luminance Characteristics of Film

Influences on light condensation performance associated with changing the surface shape of the polarizing diffuser films were investigated.

Example 41

Polyethylene terephthalate (PET) resin ("Mitsui PET J125" from Mitsui Chemicals, Inc.) was loaded in a 40 mm-diameter single screw extruder (length-to-diameter ratio (L/D)=32) equipped with a full flight screw, and extruded through a T die for deposition onto a cooling roll. Extrusion temperature was set at 270° C. The resultant casting sheet was 600 μm in thickness.

The obtained casting sheet was cut into a 80 mm square piece. To avoid shrinkage due to heating, the cut out sheet was clamped at each side by a clamp jig (clamp margin: 5 mm from the perimeter of the sheet). The clamped sheet was loaded in a gear oven ("Soyokaze SSR-113S" from Isuzu Seisakusho Co., Ltd.) and heated at 120° C. for 4 minutes to prepare a raw sheet ready for stretching. After the heat treatment, the sheet became hazy and had a transmission haze of 9.7% as measured by turbidimeter NDH2000 from Nippon Denshoku Industries Co., Ltd.

The clamp margin was cut out from the heated sheet to prepare a 70 mm square raw sheet. The raw sheet was attached to the polymer film biaxial stretcher (Iwamoto BIX-703) by clamping each side of the sheet. The sheet was pre-heated at pre-heating temperature of 115° C. for pre-heating time of 1 minute and a half. The raw sheet was then uniaxially stretched 5 times its length at a stretching rate of 24 mm/sec in the MD direction in the extruder to prepare a uniaxially stretched resin film. Transverse sides-unclamped stretching was employed in which the sheet is stretched while the stretch sides are unclamped.

The resultant uniaxially stretched resin film was 285 μm in thickness. The resin film was measured for optical characteristics with Spectrophotometer U-4100 (Hitachi High-Technologies Corporation) and a 150 mm-diameter integrating sphere attachment in the same manner as described above: Total light transmittance was 57.7%, transmission haze was 46.8%, and transmission polarization degree was 58.1%.

A 0.3 mm-thick electroformed nickel sheet was prepared which includes on its surface an array of linear prisms (one-dimensional prisms) aligned at 50 μm pitch, sections of which are 90° in apex angle and 25 μm in thickness. The electroformed nickel sheet was placed on the uniaxially stretched resin film so that the ridge lines of the prisms are perpendicular to the stretching direction of the resin film. The laminate was sandwiched between flat stainless plates.

The sample was then placed in a pressing machine where press mold temperature was set at 150° C. and a net pressing pressure on the sheet was set at 10 MPa, and was sequentially subjected to 20 second pre-heating, 10 second press, and 20 second cooling. The cooled sample was taken out from the pressing machine, and the resin film was peeled off from the electroformed nickel sheet to prepare a polarizing diffuser film having one-dimensional prisms on its surface. The polarizing diffuser film was 279 μm in thickness.

Example 42

A uniaxially stretched resin film was manufactured in the same manner as in Example 41. An electroformed nickel sheet was prepared which includes on its surface spherical concave portions which are 60 μm in diameter and 30 μm in depth and have an area occupation ratio (ratio of the total concave portion area to the entire sheet surface area on which they are formed) of 0.8. The electroformed nickel sheet was fabricated with reference to the procedure of claim 6 of Japanese Patent No. 2626306 by using glass balls of 60 μm average diameter.

As in Example 41, the electroformed nickel sheet was placed on the uniaxially stretched resin film (the direction of crystal orientation of the sheet was arbitrary); the laminated was sandwiched between stainless plates; and the laminate was pressed to produce a polarizing diffuser film having microlens formed on the surface. The polarizing diffuser film was 282 μm in thickness.

Example 43

A uniaxially stretched resin film was manufactured in the same manner as in Example 41. An electroformed nickel sheet with an array of linear prisms such as that used in Example 41 was placed on a glass plate. UV curable resin ("PAK-02" from Toyo Gosei Co., Ltd.) was applied over the electroformed nickel sheet with care to avoid possible trapping of air bubbles. The uniaxially stretched resin film was placed on the coated resin so that the stretching direction is perpendicular to the ridge lines of the prisms. Another glass plate (upper glass plate) was further placed on the uniaxially stretched resin film for tight adhesion to the resin.

The stacked members were secured with clips placed at each side. Under pressed condition, UV light was applied to the resin through the upper glass plate at a dose of 10 mJ/cm$^2$ for resin curing. Thereafter, the uniaxially stretched resin film was peeled off from the electroformed nickel sheet. In this way a polarizing diffuser film was manufactured which includes on its surface a cured resin layer with prism shape. The polarizing diffuser film was 310 μm in thickness, including the cured resin layer thickness.

Example 44

A polarizing diffuser film which includes a cured resin layer having microlenses on its surface was manufactured in the same manner as in Example 43 except that the electroformed nickel sheet of Example 42 having spherical concave portions was used. The polarizing diffuser film was 312 μm in thickness, including the cured resin layer thickness.

Example 45

The uniaxially stretched resin film of Example 41 from which prisms were removed was employed as a polarizing diffuser film of Example 45.

Example 46

A polarizing diffuser film of Example 46 was manufactured by forming prisms on a surface of a polycarbonate resin film (PANLITE® film from Teijin Chemicals Ltd.; thickness: 125 μm) in the same manner as in Example 41. In this Example, press mold temperature was set at 210° C. The resultant polarizing diffuser film was 123 μm in thickness.

Example 47

A polarizing diffuser film of Example 47 was manufactured by forming a cured resin layer having microlenses on a surface of "A-PET sheet FR" (Teijin Chemicals Ltd., non-surface treated sheet; thickness: 330 μm) in the same manner as in Example 41. The polarizing diffuser film was 353 μm in thickness, including the cured resin layer thickness.

Example 48

A BEFII film (Sumitomo 3M Limited), a prism film which includes a biaxially stretched PET film as a base film, was bonded at its prism-free side to a surface of the uniaxially stretched resin film of Example 41 with an acrylic transparent adhesive (thickness: 25 μm), to manufacture a polarizing diffuser film of Example 48. The BEFII film was bonded to the polarizing diffuser film so that the ridge lines of the prisms are perpendicular to the stretching direction of the resin film. The polarizing diffuser film was 458 μm in thickness, 1) Luminance Measurement Using the polarizing diffuser films prepared in Examples 41-48, liquid crystal display devices were manufactured. 10.4-inch VA-mode TFT liquid crystal displays (Kyocera Corporation) were first prepared, where the absorption axis of the lower polarizing plate of the liquid crystal panel is made parallel to the vertical direction of the display screen.

In the respective displays, the configuration over the light guide of the backlight unit (a dual CCFL side light type backlight) was changed as follows:

1) A beads-coated diffuser film was placed on the light guide (the film has a total light transmittance of 58% and transmission haze of 91% for light incident on the opposite side of the film from the light diffusing surface);

2) The polarizing diffuser film (test film) of any of Examples and Comparative Examples was placed on the center of the beads-coated diffuser film (liquid crystal panel side), the test film being 3.5 cm in vertical direction and 2.5 cm in horizontal direction of the display screen; and 3) For light blocking, a black mask sheet was applied over an area of the beads-coated diffuser film not covered with the test film.

In Examples 41-44, 45 and 48, the polarizing diffuser films were arranged so that the stretching axis (reflection axis) of the uniaxially stretched resin film is substantially parallel to the absorption axis of the lower polarizing plate of the liquid crystal panel, i.e., parallel to the vertical direction of the display screen.

In Examples 46 and 47, the polarizing diffuser films were arranged so that the ridge lines of the prisms are in parallel to the horizontal direction of the display screen.

In Example 49, no polarizing diffuser film was provided. Specifically, only a black mask sheet for light blocking was arranged between the beads-coated diffuser film and liquid crystal panel.

The liquid crystal display device thus manufactured was placed on the X-Y-θ stage, and then normal-direction luminance and total luminance were measured with TOPCON BM-7 luminance meter as follows.

The luminance meter was placed so that the measurement axis is aligned with the normal of the display screen of the liquid crystal device (i.e., a viewing angle is 0°). The liquid crystal device was horizontally rotated by 170° within a viewing angle of −85° to 85°, during which luminance at the center of the display screen was measured at 5° angle intervals at 1° field angle. Luminance at a viewing angle of 0° at 1° field angle is defined as normal-direction luminance. Furthermore, values (hereinafter referred to as "integral luminance") of luminance measured at 5° intervals from −85° to 85° were summed up. The results are listed in Table 10.

TABLE 10

|  | VERTICAL LUMINANCE (cd/m$^2$) | INTEGRAL LUMINANCE (cd/m$^2$) |
|---|---|---|
| EXAMPLE 41 | 192 | 3429 |
| EXAMPLE 42 | 164 | 3086 |
| EXAMPLE 43 | 201 | 3466 |
| EXAMPLE 44 | 171 | 2967 |
| EXAMPLE 45 | 120 | 2780 |
| EXAMPLE 46 | 162 | 2928 |
| EXAMPLE 47 | 143 | 2509 |
| EXAMPLE 48 | 119 | 2562 |
| EXAMPLE 49 | 101 | 2383 |

The polarizing diffuser films of Examples 41-44 exhibited high values of normal-direction luminance and integral luminance, compared to those of Example 45 (uniaxially stretched resin sheet without prisms), Example 46 (non-stretched resin sheet with prisms) and Example 47 (non-stretched resin sheet with microlenses). Example 48 (uniaxially stretched resin sheet having a prism sheet attached) exhibited slightly low luminance compared to Example 45 because polarized light was slightly disturbed due to large phase difference between the biaxially stretched PET film and polarizing diffuser film.

The present application claims the priorities of Japanese Patent Application No. 2008-175942 filed on Jul. 4, 2008, Japanese Patent Application No. 2008-288868 filed on Nov. 11, 2008, Japanese Patent Application No. 2008-315926 filed on Dec. 11, 2008, Japanese Patent Application No. 2008-333997 filed on Dec. 26, 2008, and Japanese Patent Application No. 2009-119085 filed on May 15, 2009, the entire contents of which are herein incorporated by reference.

INDUSTRIAL APPLICABILITY

The present invention provides a film which efficiently allows a polarized light beam with specific linear polarization to pass through and diffuse while efficiently reflecting a polarized light beam with linear polarization perpendicular to that specific polarization. A liquid crystal display device which includes this film offers high luminance and wider viewing angle as well as less luminance unevenness. Moreover, the polarizing diffuser film according to the present invention can also enhance normal-direction luminance.

| Explanation of Reference Numerals | |
|---|---|
| 10 | Liquid crystal cell |
| 20 | Upper polarizing plate |
| 21 | Lower polarizing plate |
| 30 | Polarizing diffuser film |
| 40 | Optical device |

-continued

| Explanation of Reference Numerals | |
|---|---|
| 50 | light guide |
| 60 | Reflective sheet |
| 70 | Light source |
| 80 | Diffuser Plate |
| 100 | Non-polarized light from light source |
| 101 | Polarized light beam V |
| 102 | Polarized light beam P |
| 103 | Polarized light beam P |
| 104 | Reflection light |
| P1 | Prism pitch |
| θ1, θ2 | Prism apex angle |
| h1 | Prism height |
| P2 | Distance between the apexes of quadrangular pyramids |
| h2 | Quadrangular pyramid height |
| D | Spherical lens diameter |
| h' | Spherical lens height |

The invention claimed is:

1. A polarizing diffuser film made of substantially one kind of crystalline resin having an intrinsic birefringence of 0.1 or more, wherein the film has:
   a total light transmittance to visible light of 50-90%,
   a transmission haze to visible light of 15-90%, and
   a transmission polarization degree to visible light degree of 20-90%, and wherein
   a bright-dark structure having dark portions and bright portions dispersed in the dark portions is observed in a TEM image of a first cross section of the film which imaged area has a thickness of 0.1 μm in film thickness direction and has an area of 45 μm$^2$, and
   the bright portions and dark portions in the bright-dark structure are made of substantially the same composition and have different crystallinity from each other.

2. The polarizing diffuser film according to claim 1, wherein:
   the film is a uniaxially stretched film made of the substantially one kind of crystalline resin, and
   a bright-dark structure having dark portions and bright portions dispersed in the dark portions is also observed in a TEM image of a second cross section of the film cut perpendicular to the stretching direction of the film which imaged area has a thickness of 0.1 μm in film thickness direction and has an area of 45 μm$^2$).

3. The polarizing diffuser film according to claim 2, wherein
   in a binarized image of the bright-dark structure in the second cross section of the film, the area ratio of the bright portions is 6-80%.

4. The polarizing diffuser film according to claim 1, wherein the film has a molecular orientation ratio-correction (MOR-c) at 100 μm film thickness of 1.2-7 as measured with a microwave molecular orientation analyzer.

5. The polarizing diffuser film according to claim 1, wherein the film has a transmission polarization degree at 100 μm film thickness of 30-90%.

6. The polarizing diffuser film according to claim 1, wherein the film has a crystallinity of 8-40%.

7. The polarizing diffuser film according to claim 1, wherein the crystalline resin is selected from the group consisting of polyester resins, aromatic polyetherketone resins, and liquid crystalline resins.

8. The polarizing diffuser film according to claim 1, wherein the crystalline resin is polyethylene terephthalate resin or polyethylene naphthalate resin.

9. The polarizing diffuser film according to claim 1, wherein the film has a light condensable surface shape on at least one surface thereof.

10. The polarizing diffuser film according to claim 9, wherein the light condensable surface shape is a surface shape of the polarizing diffuser film itself, or a shape of a resin layer on the polarizing diffuser film.

11. The polarizing diffuser film according to claim 9, wherein the light condensable surface shape is selected from the group consisting of one-dimensional prisms, two-dimensional prisms, and microlenses.

12. A method of manufacturing a polarizing diffuser film according to claim 1, comprising:

producing a crystallized sheet by heating an amorphous sheet made of crystalline resin having an intrinsic birefringence of 0.1 or more; and substantially uniaxially stretching the crystallized sheet.

13. The method according to claim 12, wherein the step of producing a crystallized sheet includes heating the amorphous sheet at temperature T which satisfies the following Inequality (1) until crystallinity of the sheet reaches 3% or higher:

$$Tc-30°C. \leq T < Tm-10°C. \qquad \text{Inequality (1)}$$

where Tc is a crystallization temperature of the crystalline resin, and Tm is a melting temperature of the crystalline resin.

14. The method according to claim 12, wherein the crystallized sheet has a transmission haze to visible light of 7-70%, and a crystallinity of 3-20%.

15. A liquid crystal display device comprising in order:
(A) a surface light source for a backlight of a liquid crystal display;
(B) at least one optical device and/or air gap;
(C) the polarizing diffuser film according to claim 1; and
(D) a liquid crystal panel which includes a liquid crystal cell sandwiched between two or more polarizing plates.

16. The liquid crystal display device according to claim 15, wherein the polarizing diffuser film is arranged adjacent to the liquid crystal panel.

17. The liquid crystal display device according to claim 16, wherein the polarizing diffuser film also serves as a light source-side protective film for the polarizing plates of the liquid crystal panel.

18. The liquid crystal display device according to claim 15, wherein a polarized-light reflection axis of the polarizing diffuser film is directed in substantially the same direction as an absorption axis of the polarizing plate arranged at the light source-side of the liquid crystal panel.

19. The polarizing diffuser film according to claim 1, wherein:

the first cross section of the film is a cross section of the film cut parallel to a reflection axis of the film, and the bright portions have major axes which are substantially parallel to one another.

20. The polarizing diffuser film according to claim 1, wherein:

the film is a uniaxially stretched film made of the substantially one kind of crystalline resin, and the first cross section of the film is a cross section of the film cut parallel to the stretching direction of the film.

* * * * *